(12) United States Patent
Taylor

(10) Patent No.: US 8,715,012 B2
(45) Date of Patent: May 6, 2014

(54) MANAGED ELECTRICAL CONNECTIVITY SYSTEMS

(75) Inventor: Chris Taylor, Cheltenham Glos (GB)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/446,574

(22) Filed: Apr. 13, 2012

(65) Prior Publication Data

US 2012/0322310 A1 Dec. 20, 2012

Related U.S. Application Data

(60) Provisional application No. 61/476,041, filed on Apr. 15, 2011.

(51) Int. Cl.
*H01R 13/64* (2006.01)

(52) U.S. Cl.
USPC ............................................. 439/676

(58) Field of Classification Search
USPC ................ 439/676, 76.1, 344, 189, 395
See application file for complete search history.

(56) References Cited

U.S. PATENT DOCUMENTS

| | | | |
|---|---|---|---|
| 3,243,761 A | 3/1966 | Piorunneck | |
| 4,127,317 A | 11/1978 | Tyree | |
| 4,953,194 A | 8/1990 | Hansen et al. | |
| 4,968,929 A | 11/1990 | Hauck et al. | |
| 5,030,123 A * | 7/1991 | Silver | 439/188 |
| 5,052,940 A | 10/1991 | Bengal | |
| 5,107,532 A | 4/1992 | Hansen et al. | |
| 5,161,988 A | 11/1992 | Krupka | |
| 5,166,970 A | 11/1992 | Ward | |
| 5,197,895 A | 3/1993 | Stupecky | |
| 5,222,164 A | 6/1993 | Bass, Sr. et al. | |
| 5,265,187 A | 11/1993 | Morin et al. | |
| 5,305,405 A | 4/1994 | Emmons et al. | |
| 5,353,367 A | 10/1994 | Czosnowski et al. | |
| 5,382,182 A | 1/1995 | Shen et al. | |
| 5,393,249 A | 2/1995 | Morgenstern et al. | |

(Continued)

FOREIGN PATENT DOCUMENTS

| | | |
|---|---|---|
| CA | 2499803 | 4/2004 |
| DE | 102 44 304 | 3/2004 |

(Continued)

OTHER PUBLICATIONS

*Avaya's Enhanced Systimax® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

(Continued)

*Primary Examiner* — Neil Abrams
*Assistant Examiner* — Phuongchi T Nguyen
(74) *Attorney, Agent, or Firm* — Merchant & Gould P.C.

(57) ABSTRACT

A receptacle block defines one or more sockets at which plugs may be received. Each socket contains a first set of contacts and a second set of contacts. Each socket also includes a sensing contact that interacts with the second set of contacts to close an electrical switch. For example, the sensing contact can interact with an arm extending from one of the contacts of the second set. Closure of the switch can be detected and interpreted to indicate that a plug has been received at the respective socket.

24 Claims, 17 Drawing Sheets

(56) References Cited

U.S. PATENT DOCUMENTS

| | | |
|---|---|---|
| 5,394,503 A | 2/1995 | Dietz, Jr. et al. |
| 5,413,494 A | 5/1995 | Dewey et al. |
| 5,415,570 A | 5/1995 | Sarkissian |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs |
| 5,470,251 A | 11/1995 | Sano |
| 5,473,715 A | 12/1995 | Schofield et al. |
| 5,483,467 A | 1/1996 | Krupka et al. |
| 5,660,567 A | 8/1997 | Nierlich et al. |
| 5,674,085 A | 10/1997 | Davis |
| 5,685,741 A | 11/1997 | Dewey et al. |
| 5,704,797 A * | 1/1998 | Meyerhoefer et al. ........ 439/188 |
| 5,712,942 A | 1/1998 | Jennings et al. |
| 5,800,192 A | 9/1998 | David |
| 5,821,510 A | 10/1998 | Cahen et al. |
| 5,854,824 A | 12/1998 | Bengal et al. |
| 5,871,368 A | 2/1999 | Erdner |
| 5,910,776 A | 6/1999 | Black |
| 6,002,331 A | 12/1999 | Laor |
| 6,095,837 A | 8/2000 | David et al. |
| 6,095,851 A | 8/2000 | Laity |
| 6,116,961 A | 9/2000 | Henneberger et al. |
| 6,222,908 B1 | 4/2001 | Bartolutti |
| 6,222,975 B1 | 4/2001 | Gilbert et al. |
| 6,227,911 B1 | 5/2001 | Boutros |
| 6,234,830 B1 | 5/2001 | Ensz et al. |
| 6,238,235 B1 | 5/2001 | Shavit et al. |
| 6,244,908 B1 | 6/2001 | Hammond et al. |
| 6,280,231 B1 | 8/2001 | Nicholls |
| 6,285,293 B1 | 9/2001 | German et al. |
| 6,300,877 B1 | 10/2001 | Schannach et al. |
| 6,330,148 B1 | 12/2001 | Won et al. |
| 6,330,307 B1 | 12/2001 | Bloch et al. |
| 6,350,148 B1 | 2/2002 | Bartolutti |
| 6,364,694 B1 | 4/2002 | Lien |
| 6,371,780 B1 * | 4/2002 | Aponte et al. ................ 439/188 |
| 6,421,322 B1 | 7/2002 | Koziy et al. |
| 6,422,895 B1 | 7/2002 | Lien |
| 6,424,710 B1 | 7/2002 | Bartolutti |
| 6,431,892 B1 | 8/2002 | Shupe et al. |
| 6,456,768 B1 | 9/2002 | Boncek et al. |
| D466,479 S | 12/2002 | Pein et al. |
| 6,499,861 B1 | 12/2002 | German |
| 6,511,231 B2 | 1/2003 | Lampert et al. |
| 6,522,737 B1 | 2/2003 | Bartolutti et al. |
| 6,554,484 B2 | 4/2003 | Lampert |
| 6,574,586 B1 | 6/2003 | David et al. |
| 6,612,856 B1 * | 9/2003 | McCormack ................ 439/188 |
| 6,626,697 B1 | 9/2003 | Martin et al. |
| 6,636,152 B2 | 10/2003 | Schannach et al. |
| 6,641,443 B1 | 11/2003 | Itano et al. |
| 6,663,436 B1 | 12/2003 | Arnett et al. |
| 6,684,179 B1 | 1/2004 | David |
| 6,725,177 B2 | 4/2004 | David et al. |
| 6,743,044 B2 | 6/2004 | Musolf et al. |
| 6,780,035 B2 * | 8/2004 | Bohbot ........................ 439/188 |
| 6,786,776 B2 | 9/2004 | Itano et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,811,446 B1 | 11/2004 | Chang |
| 6,814,624 B2 | 11/2004 | Clark et al. |
| 6,850,685 B2 | 2/2005 | Tinucci et al. |
| 6,898,368 B2 | 5/2005 | Colombo et al. |
| 6,905,363 B2 | 6/2005 | Musolf et al. |
| 6,932,517 B2 | 8/2005 | Swayze et al. |
| D510,068 S | 9/2005 | Haggay et al. |
| 6,939,168 B2 | 9/2005 | Oleynick |
| 6,961,675 B2 | 11/2005 | David |
| 6,971,895 B2 | 12/2005 | Sago et al. |
| 6,976,867 B2 | 12/2005 | Navarro et al. |
| 7,077,710 B2 | 7/2006 | Haggay et al. |
| 7,081,808 B2 | 7/2006 | Colombo et al. |
| 7,112,090 B2 | 9/2006 | Caveney et al. |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,207,819 B2 | 4/2007 | Chen |
| 7,210,858 B2 | 5/2007 | Sago et al |
| 7,226,217 B1 | 6/2007 | Benton et al. |
| 7,234,944 B2 | 6/2007 | Nordin et al. |
| 7,241,157 B2 | 7/2007 | Zhuang |
| 7,297,018 B2 | 11/2007 | Caveney et al. |
| 7,312,715 B2 | 12/2007 | Shalts et al. |
| D559,186 S | 1/2008 | Kelmer |
| 7,314,392 B2 | 1/2008 | Pharn et al. |
| 7,314,393 B2 | 1/2008 | Hashim |
| 7,315,224 B2 | 1/2008 | Gurovich et al. |
| 7,352,289 B1 | 4/2008 | Harris |
| 7,370,106 B2 | 5/2008 | Caveney |
| 7,384,300 B1 | 6/2008 | Salgado |
| 7,396,245 B2 | 7/2008 | Huang |
| 7,479,032 B2 | 1/2009 | Hoath et al. |
| 7,497,709 B1 | 3/2009 | Zhang |
| 7,519,000 B2 | 4/2009 | Caveney et al. |
| 7,534,137 B2 | 5/2009 | Caveney et al. |
| 7,552,872 B2 | 6/2009 | Tokita et al. |
| 7,563,116 B2 | 7/2009 | Wang |
| 7,570,861 B2 | 8/2009 | Smrha et al. |
| 7,575,454 B1 | 8/2009 | Aoki |
| 7,588,470 B2 | 9/2009 | Li |
| 7,591,667 B2 | 9/2009 | Gatnau Navarro et al. |
| 7,607,926 B2 | 10/2009 | Wang |
| 7,635,280 B1 | 12/2009 | Crumlin |
| 7,648,377 B2 | 1/2010 | Naito |
| 7,682,174 B2 | 3/2010 | Chen |
| 7,722,370 B2 | 5/2010 | Chin |
| 7,727,026 B2 | 6/2010 | Qin |
| 7,785,154 B2 * | 8/2010 | Peng .............................. 439/676 |
| 7,798,832 B2 | 9/2010 | Qin |
| 7,811,119 B2 | 10/2010 | Caveney et al. |
| 7,814,240 B2 | 10/2010 | Salgado |
| 7,867,017 B1 | 1/2011 | Chen |
| 7,869,426 B2 | 1/2011 | Hough et al. |
| 7,872,738 B2 | 1/2011 | Abbott |
| 7,880,475 B2 | 2/2011 | Crumlin |
| 7,914,310 B2 | 3/2011 | Johansson et al. |
| 8,157,582 B2 | 4/2012 | Frey et al. |
| 8,282,425 B2 * | 10/2012 | Bopp et al. .................... 439/676 |
| 8,287,316 B2 * | 10/2012 | Pepe et al. .................... 439/676 |
| 8,408,926 B1 * | 4/2013 | Chang .......................... 439/188 |
| 8,480,438 B2 | 7/2013 | Mattson |
| 2002/0008613 A1 | 1/2002 | Nathan et al. |
| 2004/0052498 A1 | 3/2004 | Colombo et al. |
| 2004/0240807 A1 | 12/2004 | Frohlich et al. |
| 2006/0160395 A1 | 7/2006 | Macauley et al. |
| 2006/0234564 A1 | 10/2006 | Pharn et al. |
| 2007/0237470 A1 | 10/2007 | Aronson et al. |
| 2007/0254529 A1 | 11/2007 | Pepe et al. |
| 2008/0090454 A1 | 4/2008 | Hoath et al. |
| 2008/0100467 A1 | 5/2008 | Downie et al. |
| 2009/0097846 A1 | 4/2009 | Kozischek et al. |
| 2009/0166404 A1 | 7/2009 | German et al. |
| 2009/0215310 A1 | 8/2009 | Hoath et al. |
| 2009/0232455 A1 | 9/2009 | Nhep |
| 2010/0048064 A1 * | 2/2010 | Peng ............................. 439/676 |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2011/0115494 A1 | 5/2011 | Taylor et al. |
| 2011/0228473 A1 | 9/2011 | Anderson et al. |
| 2012/0003877 A1 * | 1/2012 | Bareel et al. .................. 439/676 |
| 2012/0021636 A1 | 1/2012 | Debenedictis et al. |
| 2012/0184141 A1 | 7/2012 | Mattson |

FOREIGN PATENT DOCUMENTS

| | | |
|---|---|---|
| DE | 10 2004 033 940 A1 | 2/2006 |
| DE | 10 2008 034 261 A1 | 1/2010 |
| DE | 10 2008 052 857 A1 | 4/2010 |

(56) References Cited

FOREIGN PATENT DOCUMENTS

| WO | WO 00/65696 | 11/2000 |
|---|---|---|
| WO | WO 02/47215 A1 | 6/2002 |
| WO | WO 2010/001400 A1 | 1/2010 |
| WO | WO 2010/081186 A1 | 7/2010 |
| WO | WO 2010/121639 A1 | 10/2010 |

OTHER PUBLICATIONS

*Avaya's Enhanced Systimax® iPatch System Enables IT Managers to Optimise Network Efficiency and Cut Downtime*, Press Release, May 9, 2003, obtained from http://wvvw.avaya.com/usa/about-avaya/newsroom/news-releases/2003/pr-030509 on Jan. 7, 2009.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes*! NORDX/CDT ©2003 (6 pages).

iTRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

*Systimax® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

Ohtsuki, F. et al., "Design of Optical Connectors with ID Modules," Electronics ad Communications in Japan, Part 1, vol. 77, No. 2, pp. 94-105 (Feb. 1994).

TrueNet; TFP Series Rack Mount Fiber Panels, Spec Sheet; May 2008; 8 pages.

International Search Report and Written Opinion for PCT/US2011/056420 mailed Jan. 13, 2012.

International Search Report and Written Opinion for PCT/US2010/053228 mailed Mar. 28, 2011.

Invitation to Pay Additional Fees with Partial International Search for PCT/US2010/053228 mailed Feb. 14, 2011.

* cited by examiner

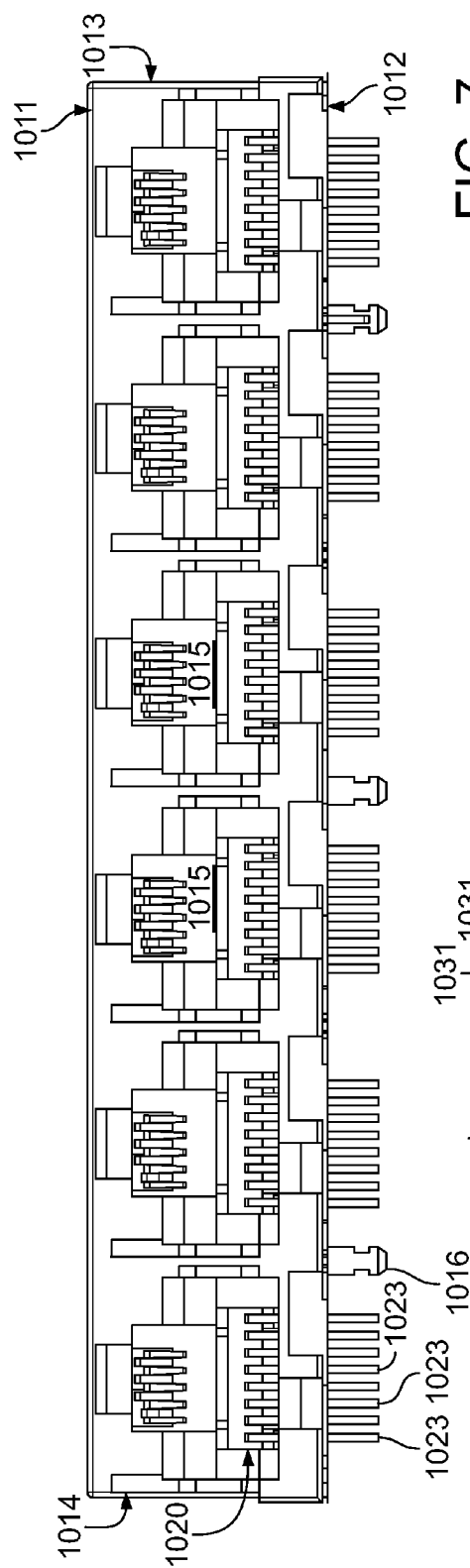
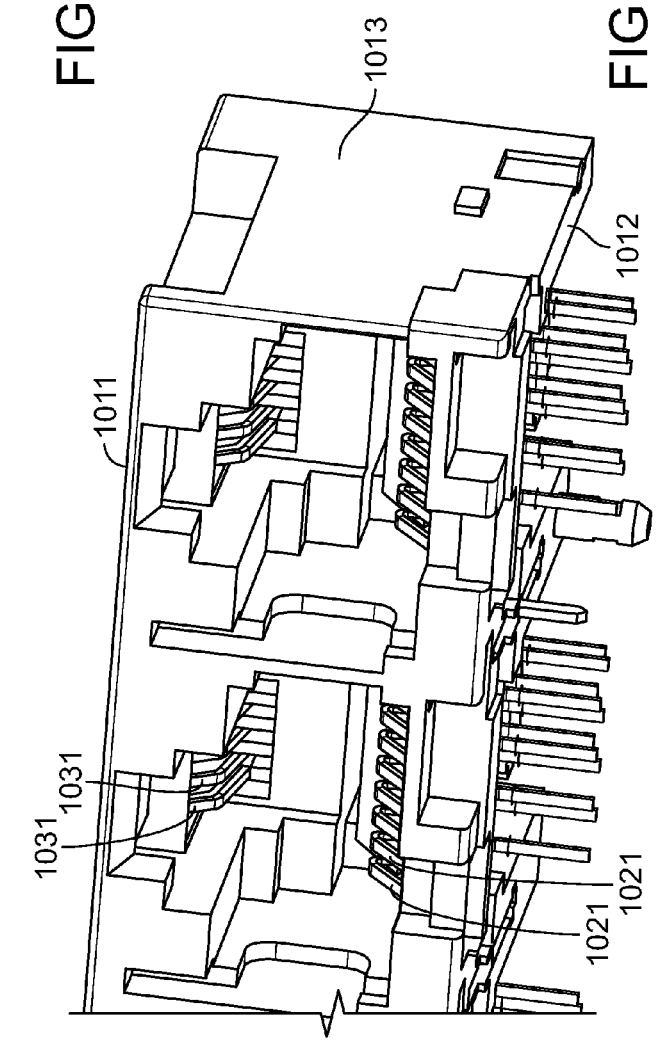
FIG. 7
FIG. 8

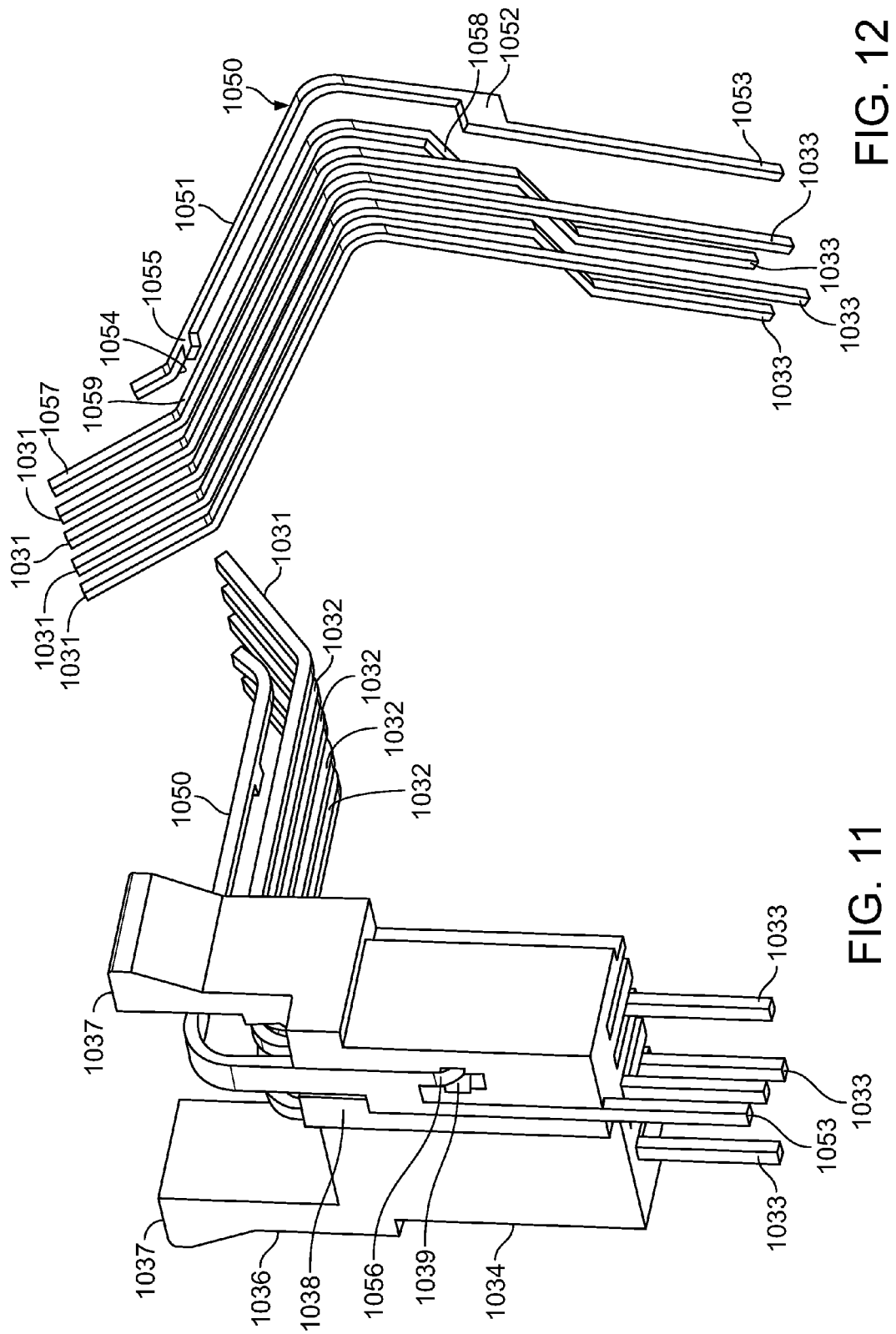

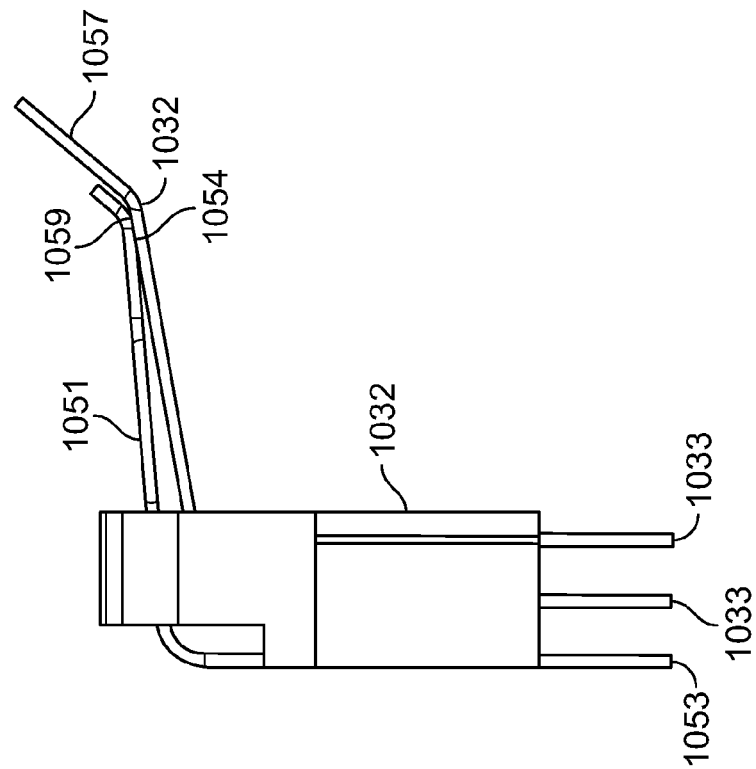
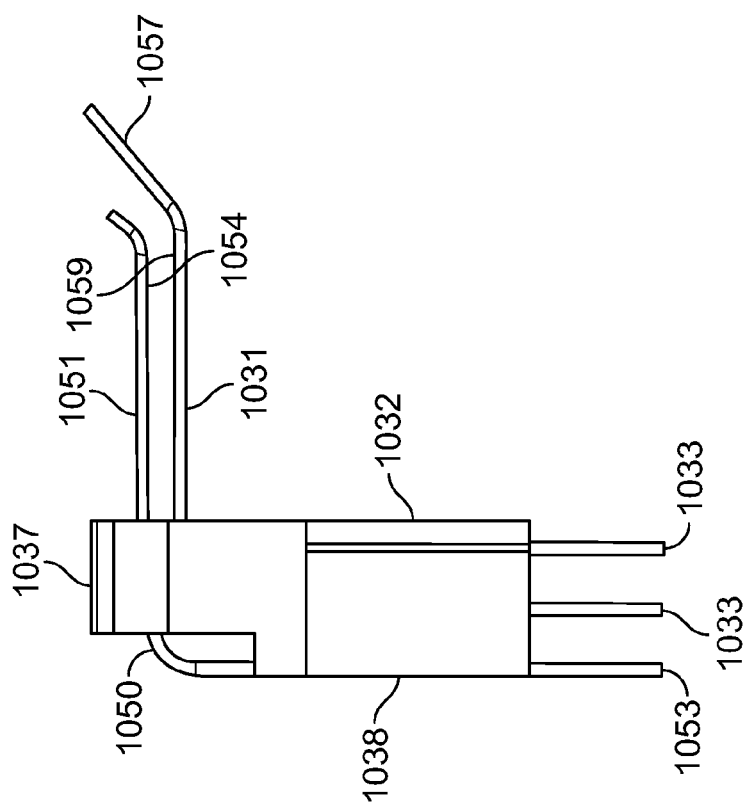

MANAGED ELECTRICAL CONNECTIVITY SYSTEMS

CROSS REFERENCE TO RELATED APPLICATION

This application claims the benefit of U.S. Provisional Application No. 61/476,041, filed Apr. 15, 2011, and titled "Managed Electrical Connectivity Systems," the disclosure of which is hereby incorporated herein by reference.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and connector arrangements that provide physical layer management capabilities. In accordance with certain aspects, the disclosure relates to fiber optic connector assemblies and connector arrangements.

In certain implementations, the disclosure relates to connector arrangements having primary contact arrangements for communication signal transmission and secondary contact arrangements for management signal transmission.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a front elevational view of the receptacle block of FIG. 6;

FIG. 8 is an enlarged view of a portion of the receptacle block of FIG. 6 in which a two rows of contacts are visible;

FIG. 11 is bottom perspective view of a second contact set including a plurality of second contact members and a sensing contact retained in a module housing in accordance with principles of the present disclosure;

FIG. 12 is a perspective view of the second contact members and sensing contact of the second contact set with the module housing removed to show the full lengths of the contacts;

FIG. 15 is a side elevational view of the second contact set with the second contact members configured in an initial position;

FIG. 16 is a side elevational view of the second contact set of FIG. 15 with the second contact members moved to an engagement position relative to the sensing contact;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
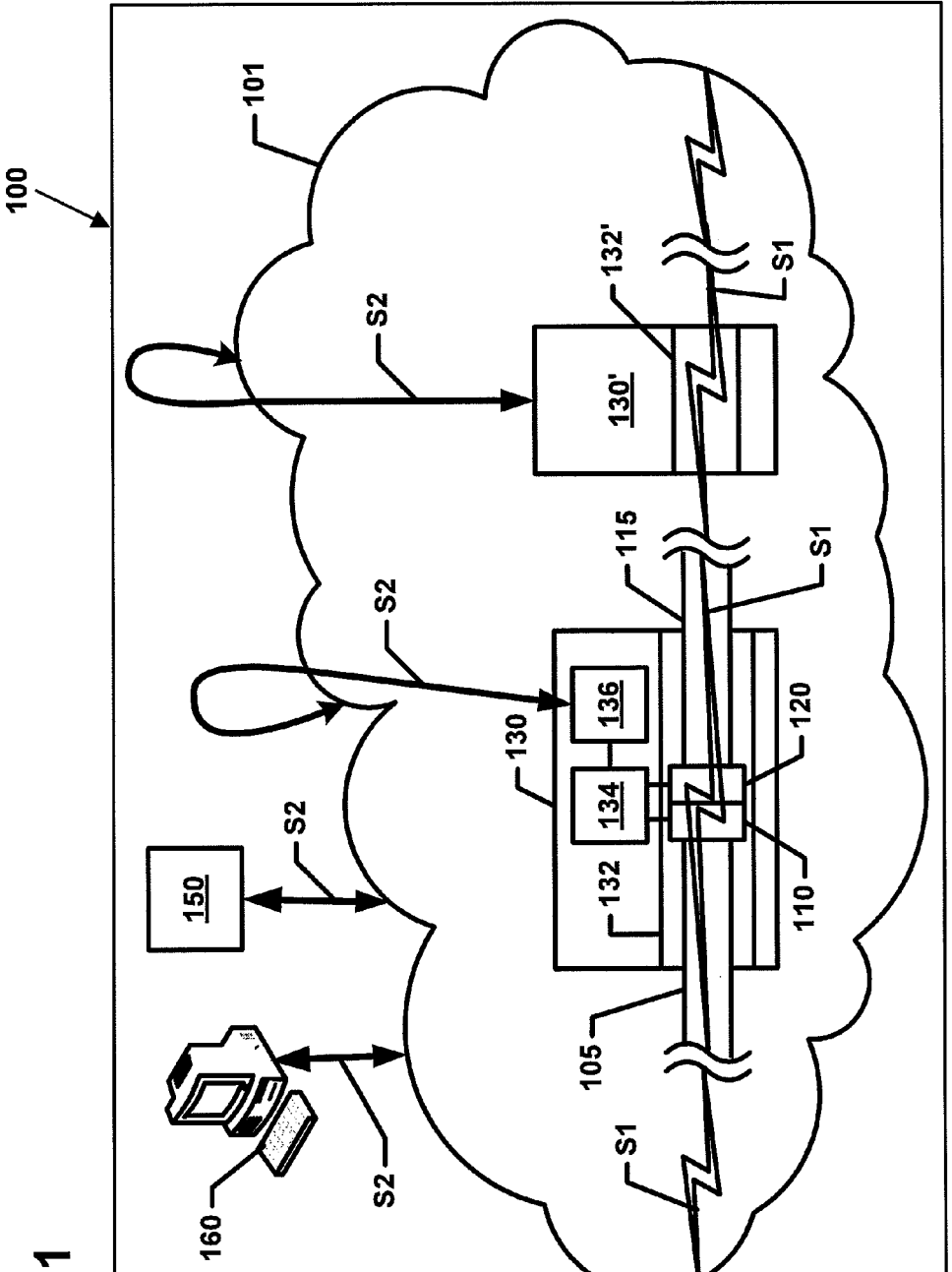
FIG. 1 is a block diagram of a portion of an example communications and data management system in accordance with aspects of the present disclosure.

FIG. 1 is a diagram of a portion of an example communications and data management system 100. The example system 100 shown in FIG. 1 includes a part of a communications network 101 along which communications signals S1 pass. In one example implementation, the network 101 can include an Internet Protocol network. In other implementations, however, the communications network 101 may include other types of networks.

The communications network 101 includes interconnected network components (e.g., connector assemblies, inter-networking devices, internet working devices, servers, outlets, and end user equipment (e.g., computers)). In one example implementation, communications signals S1 pass from a computer, to a wall outlet, to a port of communication panel, to a first port of an inter-networking device, out another port of the inter-networking device, to a port of the same or another communications panel, to a rack mounted server. In other implementations, the communications signals S1 may follow other paths within the communications network 101.

The portion of the communications network 101 shown in FIG. 1 includes first and second connector assemblies 130, 130' at which communications signals S1 pass from one portion of the communications network 101 to another portion of the communications network 101. Non-limiting examples of connector assemblies 130, 130' include, for example, rack-mounted connector assemblies (e.g., patch panels, distribution units, and media converters for fiber and copper physical communication media), wall-mounted connector assemblies (e.g., boxes, jacks, outlets, and media converters for fiber and copper physical communication media), and inter-networking devices (e.g., switches, routers, hubs, repeaters, gateways, and access points).

In the example shown, the first connector assembly 130 defines at least one port 132 configured to communicatively couple at least a first media segment (e.g., cable) 105 to at least a second media segment (e.g., cable) 115 to enable the communication signals S1 to pass between the media segments 105, 115. The at least one port 132 of the first connector assembly 130 may be directly connected to a port 132' of the second connector assembly 130'. As the term is used herein, the port 132 is directly connected to the port 132' when the communications signals S1 pass between the two ports 132, 132' without passing through an intermediate port. For example, plugging a first terminated end of a patch cable into the port 132 and a second terminated end of the patch cable into the port 132' directly connects the ports 132, 132'.

The port 132 of the first connector assembly 130 also may be indirectly connected to the port 132' of the second connector assembly 130'. As the term is used herein, the port 132 is indirectly connected to the port 132' when the communications signals S1 pass through an intermediate port when traveling between the ports 132, 132'. For example, in one implementation, the communications signals S1 may be routed over one media segment from the port 132 at the first connector assembly 130, to a port of a third connector assembly at which the media segment is coupled, to another media segment that is routed from the port of the third connector assembly to the port 132' of the second connector assembly 130'.

Non-limiting examples of media segments include optical cables, electrical cables, and hybrid cables. The media segments may be terminated with electrical plugs, electrical jacks, fiber optic connectors, fiber optic adapters, media converters, or other termination components. In the example shown, each media segment 105, 115 is terminated at a plug or connector 110, 120, respectively, which is configured to communicatively connect the media segments 105, 115. For example, in one implementation, the port 132 of the connector assembly 130 can be configured to align ferrules of two fiber optic connectors 110, 120. In another implementation, the port 132 of the connector assembly 130 can be configured to electrically connect an electrical plug with an electrical socket (e.g., a jack). In yet another implementation, the port 132 can include a media converter configured to connect an optical fiber to an electrical conductor.

In accordance with some aspects, the connector assembly 130 does not actively manage (e.g., is passive with respect to) the communications signals S1 passing through port 132. For example, in some implementations, the connector assembly 130 does not modify the communications signal S1 carried over the media segments 105, 115. Further, in some implementations, the connector assembly 130 does not read, store, or analyze the communications signal S1 carried over the media segments 105, 115.

In accordance with aspects of the disclosure, the communications and data management system 100 also provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system 101. In accordance with some aspects, physical layer information of the communications system 101 can include media information, device information, and location information.

As the term is used herein, "media information" refers to physical layer information pertaining to cables, plugs, connectors, and other such physical media. In accordance with some aspects, the media information is stored on or in the physical media, themselves. In accordance with other aspects, the media information can be stored at one or more data repositories for the communications system, either alternatively or in addition to the media, themselves.

Non-limiting examples of media information include a part number, a serial number, a plug or other connector type, a conductor or fiber type, a cable or fiber length, cable polarity, a cable or fiber pass-through capacity, a date of manufacture, a manufacturing lot number, information about one or more visual attributes of physical communication media (e.g., information about the color or shape of the physical communication media or an image of the physical communication media), and an insertion count (i.e., a record of the number of times the media segment has been connected to another media segment or network component). Media information also can include testing or media quality or performance information. The testing or media quality or performance information, for example, can be the results of testing that is performed when a particular segment of media is manufactured.

As the term is used herein, "device information" refers to physical layer information pertaining to the communications panels, inter-networking devices, media converters, computers, servers, wall outlets, and other physical communications devices to which the media segments attach. In accordance with some aspects, the device information is stored on or in the devices, themselves. In accordance with other aspects, the device information can be stored at one or more data repositories for the communications system, either alternatively or in addition to the devices, themselves. In accordance with still other aspects, the device information can be stored in the media segments attached thereto. Non-limiting examples of device information include a device identifier, a device type, port priority data (that associates a priority level with each port), and port updates (described in more detail herein).

As the term is used herein, "location information" refers to physical layer information pertaining to a physical layout of a building or buildings in which the network 101 is deployed. Location information also can include information indicating where each communications device, media segment, network component, or other component is physically located within the building. In accordance with some aspects, the location information of each system component is stored on or in the respective component. In accordance with other aspects, the location information can be stored at one or more data repositories for the communications system, either alternatively or in addition to the system components, themselves.

In accordance with some aspects, one or more of the components of the communications network 101 are configured to store physical layer information pertaining to the component as will be disclosed in more detail herein. In FIG. 1, the connectors 110, 120, the media segments 105, 115, and/or the connector assemblies 130, 130' may store physical layer information. For example, in FIG. 1, each connector 110, 120 may store information pertaining to itself (e.g., type of connector, data of manufacture, etc.) and/or to the respective media segment 105, 115 (e.g., type of media, test results, etc.).

In another example implementation, the media segments 105, 115 or connectors 110, 120 may store media information that includes a count of the number of times that the media segment (or connector) has been inserted into port 132. In such an example, the count stored in or on the media segment is updated each time the segment (or plug or connector) is inserted into port 132. This insertion count value can be used, for example, for warranty purposes (e.g., to determine if the connector has been inserted more than the number of times specified in the warranty) or for security purposes (e.g., to detect unauthorized insertions of the physical communication media).

One or more of the components of the communications network 101 can read the physical layer information from one or more media segments retained thereat. In certain implementations, one or more network components includes a media reading interface that is configured to read physical layer information stored on or in the media segments or connectors attached thereto. For example, in one implementation, the connector assembly 130 includes a media reading interface 134 that can read media information stored on the media cables 105, 115 retained within the port 132. In another implementation, the media reading interface 134 can read media information stored on the connectors or plugs 110, 120 terminating the cables 105, 115, respectively.

In accordance with some aspects of the disclosure, the physical layer information read by a network component may be processed or stored at the component. For example, in certain implementations, the first connector assembly 130 shown in FIG. 1 is configured to read physical layer information stored on the connectors 110, 120 and/or on the media segments 105, 115 using media reading interface 134.

Accordingly, in FIG. 1, the first connector assembly 130 may store not only physical layer information about itself (e.g., the total number of available ports at that assembly 130, the number of ports currently in use, etc.), but also physical layer information about the connectors 110, 120 inserted at the ports and/or about the media segments 105, 115 attached to the connectors 110, 120.

The physical layer information obtained by the media reading interface may be communicated (see PLI signals S2) over the network 101 for processing and/or storage. In accordance with some aspects, the communications network 101 includes a data network (e.g., see network 218 of FIG. 2) along which the physical layer information is communicated. At least some of the media segments and other components of the data network may be separate from those of the communications network 101 to which such physical layer information pertains. For example, in some implementations, the first connector assembly 130 may include a plurality of "normal" ports (e.g., fiber optic adapter ports) at which connectorized media segments (e.g., optical fibers) are coupled together to create a path for communications signals S1. The first connector assembly 130 also may include one or more PLI ports 136 at which the physical layer information (see PLI signals S2) are passed to components of the data network (e.g., to one or more aggregation points 150 and/or to one or more computer systems 160).

In other implementations, however, the physical layer information may be communicated over the communications network 101 just like any other signal, while at the same time not affecting the communication signals S1 that pass through the connector assembly 130 on the normal ports 132. Indeed, in some implementations, the physical layer information may be communicated as one or more of the communication signals S1 that pass through the normal ports 132 of the connector assemblies 130, 130'. For example, in one implementation, a media segment may be routed between the PLI port 136 and one of the "normal" ports 132. In another implementation, the media segment may be routed between the PLI port 136 and a "normal" port of another connector assembly. In such implementations, the physical layer information may be passed along the communications network 101 to other components of the communications network 101 (e.g., to another connector assembly, to one or more aggregation points 150 and/or to one or more computer systems 160). By using the network 101 to communicate physical layer information pertaining to it, an entirely separate data network need not be provided and maintained in order to communicate such physical layer information.

For example, in the implementation shown in FIG. 1, each connector assembly 130 includes at least one PLI port 136 that is separate from the "normal" ports 132 of the connector assembly 130. Physical layer information is communicated between the connector assembly 130 and the communications network 101 through the PLI port 136. Components of the communications network 101 may be connected to one or more aggregation devices 150 and/or to one or more computing systems 160. In the example shown in FIG. 1, the connector assembly 130 is connected to a representative aggregation device 150, a representative computing system 160, and to other components of the network 101 (see looped arrows) via the PLI port 136.

In some implementations, some types of physical layer information pertaining to media segments can be obtained by the connector assembly 130 from a user at the connector assembly 130 via a user interface (e.g., a keypad, a scanner, a touch screen, buttons, etc.). For example, physical layer information pertaining to media that is not configured to store such information can be entered manually into the connector assembly 130 by the user. In certain implementations, the connector assembly 130 can provide the physical layer information obtained from the user to other devices or systems that are coupled to the communications network 101 and/or a separate data network.

In other implementations, some or all physical layer information can be obtained by the connector assembly 130 from other devices or systems that are coupled to the communications network 101 and/or a separate data network. For example, physical layer information pertaining to media that is not configured to store such information can be entered manually into another device or system (e.g., at the connector assembly 130, at the computer 160, or at the aggregation point 150) that is coupled to the network 101 and/or a separate data network.

In some implementations, some types of non-physical layer information (e.g., network information) also can be obtained by one network component (e.g., a connector assembly 130, an aggregation point 150, or a computer 160) from other devices or systems that are coupled to the communications network 101 and/or a separate data network. For example, the connector assembly 130 may pull non-physical layer information from one or more components of the network 101. In other implementations, the non-physical layer information can be obtained by the connector assembly 130 from a user at the connector assembly 130.

In some implementations, the connector assembly 130 is configured to modify (e.g., add, delete, and/or change) the physical layer information stored in or on the segment of physical communication media 105, 115 (i.e., or the associated connectors 110, 120). For example, in some implementations, the media information stored in or on the segment of physical communication media 105, 115 can be updated to include the results of testing that is performed when a segment of physical media is installed or otherwise checked. In other implementations, such testing information is supplied to the aggregation point 150 for storage and/or processing. The modification of the physical layer information does not affect the communications signals S1 passing through the connector assembly 130.

Figure 2:
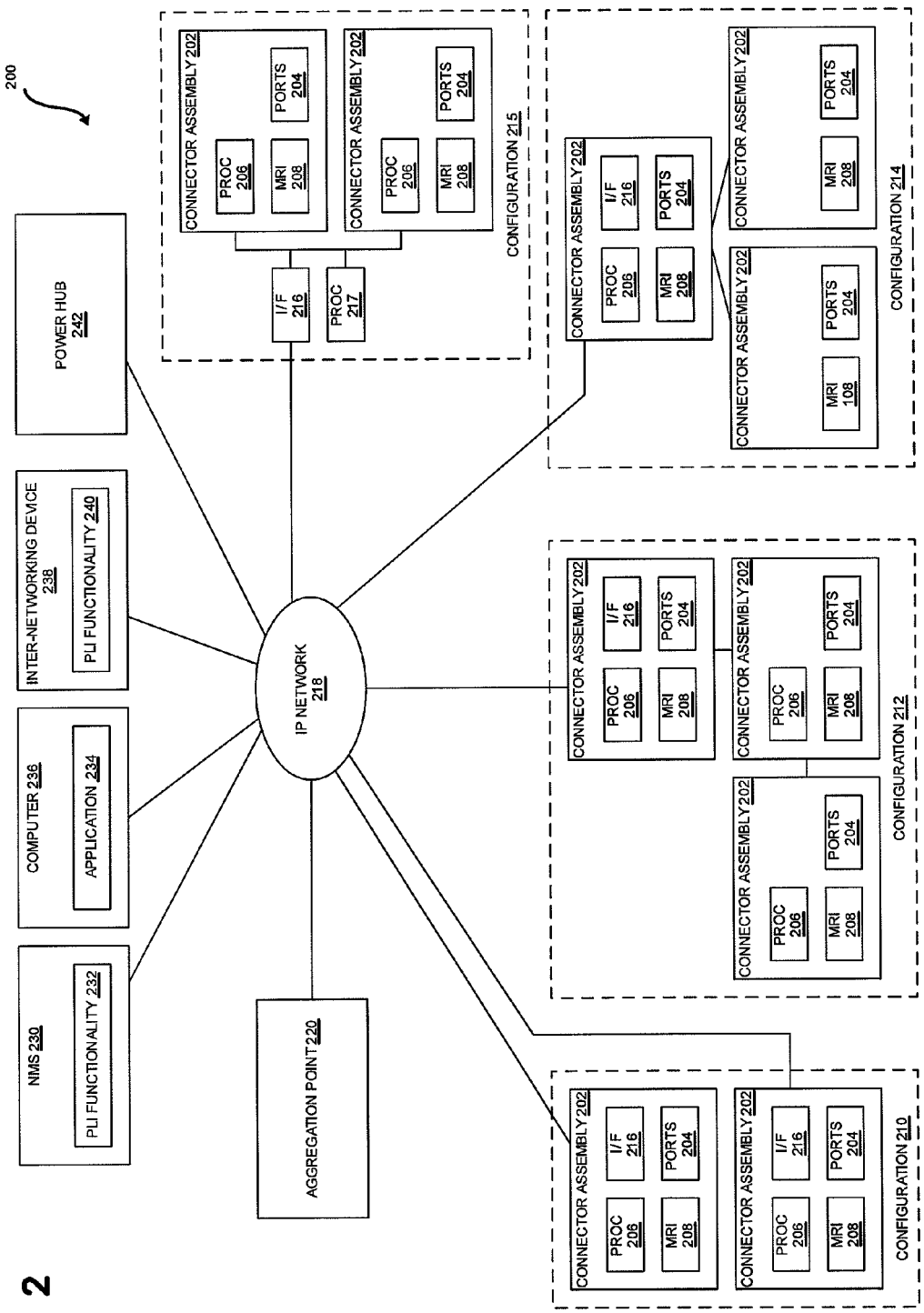
FIG. 2 is a block diagram of one embodiment of a communications management system that includes PLI functionality as well as PLM functionality in accordance with aspects of the present disclosure.

FIG. 2 is a block diagram of one example implementation of a communications management system 200 that includes PLI functionality as well as PLM functionality. The management system 200 comprises a plurality of connector assemblies 202. The management system 200 includes one or more connector assemblies 202 connected to an IP network 218. The connector assemblies 202 shown in FIG. 2 illustrate various example implementations of the connector assemblies 130, 30' of FIG. 1.

Each connector assembly 202 includes one or more ports 204, each of which is used to connect two or more segments of physical communication media to one another (e.g., to implement a portion of a logical communication link for communication signals S1 of FIG. 1). At least some of the connector assemblies 202 are designed for use with segments of physical communication media that have physical layer information stored in or on them. The physical layer information is stored in or on the segment of physical communication media in a manner that enables the stored information, when the segment is attached to a port 204, to be read by a programmable processor 206 associated with the connector assembly 202.

Each programmable processor 206 is configured to execute software or firmware that causes the programmable processor 206 to carry out various functions described below. Each programmable processor 206 also includes suitable memory (not shown) that is coupled to the programmable processor 206 for storing program instructions and data. In general, the programmable processor 206 determines if a physical communication media segment is attached to a port 204 with which that processor 206 is associated and, if one is, to read the identifier and attribute information stored in or on the attached physical communication media segment (if the segment includes such information stored therein or thereon) using the associated media reading interface 208.

In some implementations, each of the ports 204 of the connector assemblies 202 comprises a respective media reading interface 208 via which the respective programmable processor 206 is able to determine if a physical communication media segment is attached to that port 204 and, if one is, to read the physical layer information stored in or on the attached segment (if such media information is stored therein or thereon). In other implementations, a single media reading interface 208 may correspond to two or more ports 204. The programmable processor 206 associated with each connector assembly 202 is communicatively coupled to each of the media reading interfaces 208 using a suitable bus or other interconnect (not shown).

In FIG. 2, four example types of connector assembly configurations 210, 212, 214, and 215 are shown. In the first connector assembly configuration 210 shown in FIG. 2, each connector assembly 202 includes its own respective programmable processor 206 and its own respective network interface 216 that is used to communicatively couple that connector assembly 202 to an Internet Protocol (IP) network 218. In some implementations, the ports 204 of the connector assemblies 202 also connect to the IP network 218. In other implementations, however, only the network interfaces 216 couple to the IP network 218.

In the second type of connector assembly configuration 212, a group of connector assemblies 202 are physically located near each other (e.g., in a rack, rack system, or equipment closet). Each of the connector assemblies 202 in the group includes its own respective programmable processor 206. However, in the second connector assembly configuration 212, some of the connector assemblies 202 (referred to here as "interfaced connector assemblies") include their own respective network interfaces 216 while some of the connector assemblies 202 (referred to here as "non-interfaced connector assemblies") do not. The non-interfaced connector assemblies 202 are communicatively coupled to one or more of the interfaced connector assemblies 202 in the group via local connections. In this way, the non-interfaced connector assemblies 202 are communicatively coupled to the IP network 218 via the network interface 216 included in one or more of the interfaced connector assemblies 202 in the group. In the second type of connector assembly configuration 212, the total number of network interfaces 216 used to couple the connector assemblies 202 to the IP network 218 can be reduced. Moreover, in the particular implementation shown in FIG. 2, the non-interfaced connector assemblies 202 are connected to the interfaced connector assembly 202 using a daisy chain topology (though other topologies can be used in other implementations and embodiments).

In the third type of connector assembly configuration 214, a group of connector assemblies 202 are physically located near each other (e.g., within a rack, rack system, or equipment closet). Some of the connector assemblies 202 in the group (also referred to here as "master" connector assemblies 202) include both their own programmable processors 206 and network interfaces 216, while some of the connector assemblies 202 (also referred to here as "slave" connector assemblies 202) do not include their own programmable processors 206 or network interfaces 216. Each of the slave connector assemblies 202 is communicatively coupled to one or more of the master connector assemblies 202 in the group via one or more local connections. The programmable processor 206 in each of the master connector assemblies 202 is able to carry out the PLM functions for both the master connector assembly 202 of which it is a part and any slave connector assemblies 202 to which the master connector assembly 202 is connected via the local connections. As a result, the cost associated with the slave connector assemblies 202 can be reduced. In the particular implementation shown in FIG. 2, the slave connector assemblies 202 are connected to a master connector assembly 202 in a star topology (though other topologies can be used in other implementations and embodiments).

In the fourth type of connector assembly configuration 215, a group of connector assemblies (e.g., distribution modules) 202 are housed within a common chassis or other enclosure. Each of the connector assemblies 202 in the configuration 215 includes their own programmable processors 206. In the context of this configuration 215, the programmable processors 206 in the connector assemblies 202 are "slave" processors 206. Each of the slave programmable processors 206 in the group is communicatively coupled to a common "master" programmable processor 217 (e.g., over a backplane included in the chassis or enclosure). The master programmable processor 217 is coupled to a network interface 216 that is used to communicatively couple the master programmable processor 217 to the IP network 218.

In the fourth configuration 215, each slave programmable processor 206 is configured to manage the media reading interfaces 208 to determine if physical communication media segments are attached to the port 204 and to read the physical layer information stored in or on the attached physical communication media segments (if the attached segments have such information stored therein or thereon). The physical layer information is communicated from the slave programmable processor 206 in each of the connector assemblies 202 in the chassis to the master processor 217. The master processor 217 is configured to handle the processing associated with communicating the physical layer information read from by the slave processors 206 to devices that are coupled to the IP network 218.

In accordance with some aspects, the communications management system 200 includes functionality that enables the physical layer information captured by the connector assemblies 202 to be used by application-layer functionality outside of the traditional physical-layer management application domain. That is, the physical layer information is not retained in a PLM "island" used only for PLM purposes but is instead made available to other applications. For example, in the particular implementation shown in FIG. 2, the management system 200 includes an aggregation point 220 that is communicatively coupled to the connector assemblies 202 via the IP network 218.

The aggregation point 220 includes functionality that obtains physical layer information from the connector assemblies 202 (and other devices) and stores the physical layer information in a data store. The aggregation point 220 can be used to receive physical layer information from various types of connector assemblies 202 that have functionality for automatically reading information stored in or on the segment of physical communication media. Also, the aggregation point 220 and aggregation functionality 224 can be used to receive physical layer information from other types of devices that have functionality for automatically reading information stored in or on the segment of physical communication media. Examples of such devices include end-user devices— such as computers, peripherals (e.g., printers, copiers, storage devices, and scanners), and IP telephones—that include functionality for automatically reading information stored in or on the segment of physical communication media.

The aggregation point 220 also can be used to obtain other types of physical layer information. For example, in this implementation, the aggregation point 220 also obtains information about physical communication media segments that is not otherwise automatically communicated to an aggregation point 220. This information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The aggregation point 220 also includes functionality that provides an interface for external devices or entities to access the physical layer information maintained by the aggregation point 220. This access can include retrieving information from the aggregation point 220 as well as supplying information to the aggregation point 220. In this implementation, the aggregation point 220 is implemented as "middleware" that is able to provide such external devices and entities with transparent and convenient access to the PLI maintained by the access point 220. Because the aggregation point 220 aggregates PLI from the relevant devices on the IP network 218 and provides external devices and entities with access to such PLI, the external devices and entities do not need to individually interact with all of the devices in the IP network 218 that provide PLI, nor do such devices need to have the capacity to respond to requests from such external devices and entities.

For example, as shown in FIG. 2, a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. In certain implementations, the NMS 230 communicates with the aggregation point 220 over the IP network 218. In other implementations, the NMS 230 may be directly connected to the aggregation point 220.

As shown in FIG. 2, an application 234 executing on a computer 236 also can use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218.

In the example shown in FIG. 2, one or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

The aggregation point 220 can be implemented on a standalone network node (e.g., a standalone computer running appropriate software) or can be integrated along with other network functionality (e.g., integrated with an element management system or network management system or other network server or network element). Moreover, the functionality of the aggregation point 220 can be distribute across many nodes and devices in the network and/or implemented, for example, in a hierarchical manner (e.g., with many levels of aggregation points). The IP network 218 can include one or more local area networks and/or wide area networks (e.g., the Internet). As a result, the aggregation point 220, NMS 230, and computer 236 need not be located at the same site as each other or at the same site as the connector assemblies 202 or the inter-networking devices 238.

Also, power can be supplied to the connector assemblies 202 using conventional "Power over Ethernet" techniques specified in the IEEE 802.3af standard, which is hereby incorporated herein by reference. In such an implementation, a power hub 242 or other power supplying device (located near or incorporated into an inter-networking device that is coupled to each connector assembly 202) injects DC power onto one or more power cables (e.g., a power wire included in a copper twisted-pair cable) used to connect each connector assembly 202 to the IP network 218.

Figure 3:
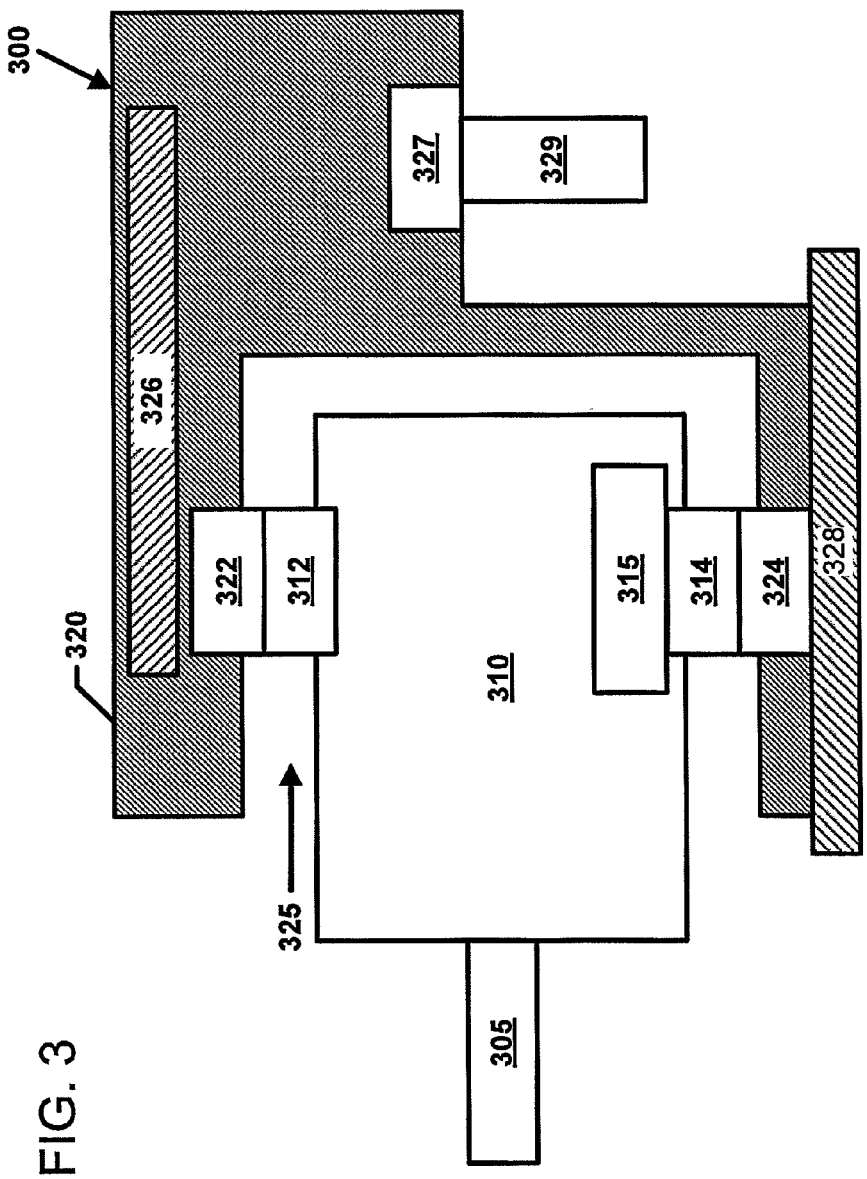
FIG. 3 is a block diagram of one high-level example of a port and media reading interface that are suitable for use in the management system of FIG. 2 in accordance with aspects of the present disclosure.

FIG. 3 is a schematic diagram of one example connection system 300 including a connector assembly 320 configured to collect physical layer information from a connector arrangement 310. The example connection system 300 shown includes a jack module 320 and an electrical plug 310. The connector arrangement 310 terminates at least a first electrical segment (e.g., a conductor cable) 305 of physical communications media and the connector assembly 320 terminates at least second electrical segments (e.g., twisted pairs of copper wires) 329 of physical communications media. The connector assembly 320 defines at least one socket port 325 in which the connector arrangement 310 can be accommodated.

Each electrical segment 305 of the connector arrangement 310 carries communication signals (e.g., communications signals S1 of FIG. 1) to primary contact members 312 on the connector arrangement 310. The connector assembly 320 includes a primary contact arrangement 322 that is accessible from the socket port 325. The primary contact arrangement 322 is aligned with and configured to interface with the primary contact members 312 to receive the communications signals (S1 of FIG. 1) from the primary contact members 312 when the connector arrangement 310 is inserted into the socket 325 of the connector assembly 320.

The connector assembly 320 is electrically coupled to one or more printed circuit boards. For example, the connector assembly 320 can support or enclose a first printed circuit board 326, which connects to insulation displacement contacts (IDCs) 327 or to another type of electrical contacts. The IDCs 327 terminate the electrical segments 329 of physical communications media (e.g., conductive wires). The first printed circuit board 326 manages the primary communication signals carried from the conductors terminating the cable 305 to the electrical segments 329 that couple to the IDCs 327.

In accordance with some aspects, the connector arrangement 310 can include a storage device 315 configured to store physical layer information. The connector arrangement 310 also includes second contact members 314 that are electrically coupled (i.e., or otherwise communicatively coupled) to the storage device 315. In one implementation, the storage device 315 is implemented using an EEPROM (e.g., a PCB surface-mount EEPROM). In other implementations, the storage device 315 is implemented using other non-volatile memory device. Each storage device 315 is arranged and configured so that it does not interfere or interact with the communications signals communicated over the media segment 305.

The connector assembly 320 also includes a second contact arrangement (e.g., a media reading interface) 324. In certain implementations, the media reading interface 324 is accessible through the socket port 325. The second contact arrangement 324 is aligned with and configured to interface with the second contact members 314 of the media segment to receive the physical layer information from the storage device 315 when the connector arrangement 310 is inserted into the socket 325 of the connector assembly 320.

In some such implementations, the storage device interfaces 314 and the media reading interfaces 324 each comprise three (3) leads—a power lead, a ground lead, and a data lead. The three leads of the storage device interface 314 come into electrical contact with three (3) corresponding leads of the media reading interface 324 when the corresponding media segment is inserted in the corresponding port 325. In certain example implementations, a two-line interface is used with a simple charge pump. In still other implementations, additional leads can be provided (e.g., for potential future applications). Accordingly, the storage device interfaces 314 and the media reading interfaces 324 may each include four (4) leads, five (5) leads, six (6) leads, etc.

The storage device 315 also may include a processor or micro-controller, in addition to the storage for the physical layer information. In some example implementations, the micro-controller can be used to execute software or firmware that, for example, performs an integrity test on the cable 305 (e.g., by performing a capacitance or impedance test on the sheathing or insulator that surrounds the cable 305, (which may include a metallic foil or metallic filler for such purposes)). In the event that a problem with the integrity of the cable 305 is detected, the micro-controller can communicate that fact to a programmable processor (e.g., processor 206 of FIG. 2) associated with the port using the storage device interface (e.g., by raising an interrupt). The micro-controller also can be used for other functions.

The connector assembly 320 also can support or enclose a second printed circuit board 328, which connects to the second contact arrangement 324. The second printed circuit board 328 manages the physical layer information communicated from a storage device 315 through second contacts 314, 324. In the example shown, the second printed circuit board 328 is positioned on an opposite side of the connector assembly 320 from the first printed circuit board 326. In other implementations, the printed circuit boards 326, 328 can be positioned on the same side or on different sides. In one implementation, the second printed circuit board 328 is positioned horizontally relative to the connector assembly 320 (see FIG. 3). In another implementation, the second printed circuit board 328 is positioned vertically relative to the connector assembly 320.

The second printed circuit board 328 can be communicatively connected to one or more programmable electronic processors and/or one or more network interfaces. In one implementation, one or more such processors and interfaces can be arranged as components on the printed circuit board 328. In another implementation, one of more such processor and interfaces can be arranged on a separate circuit board that is coupled to the second printed circuit board 328. For example, the second printed circuit board 328 can couple to other circuit boards via a card edge type connection, a connector-to-connector type connection, a cable connection, etc.

The network interface is configured to send the physical layer information to the data network (e.g., see signals S2 of FIG. 1).

Figure 4:
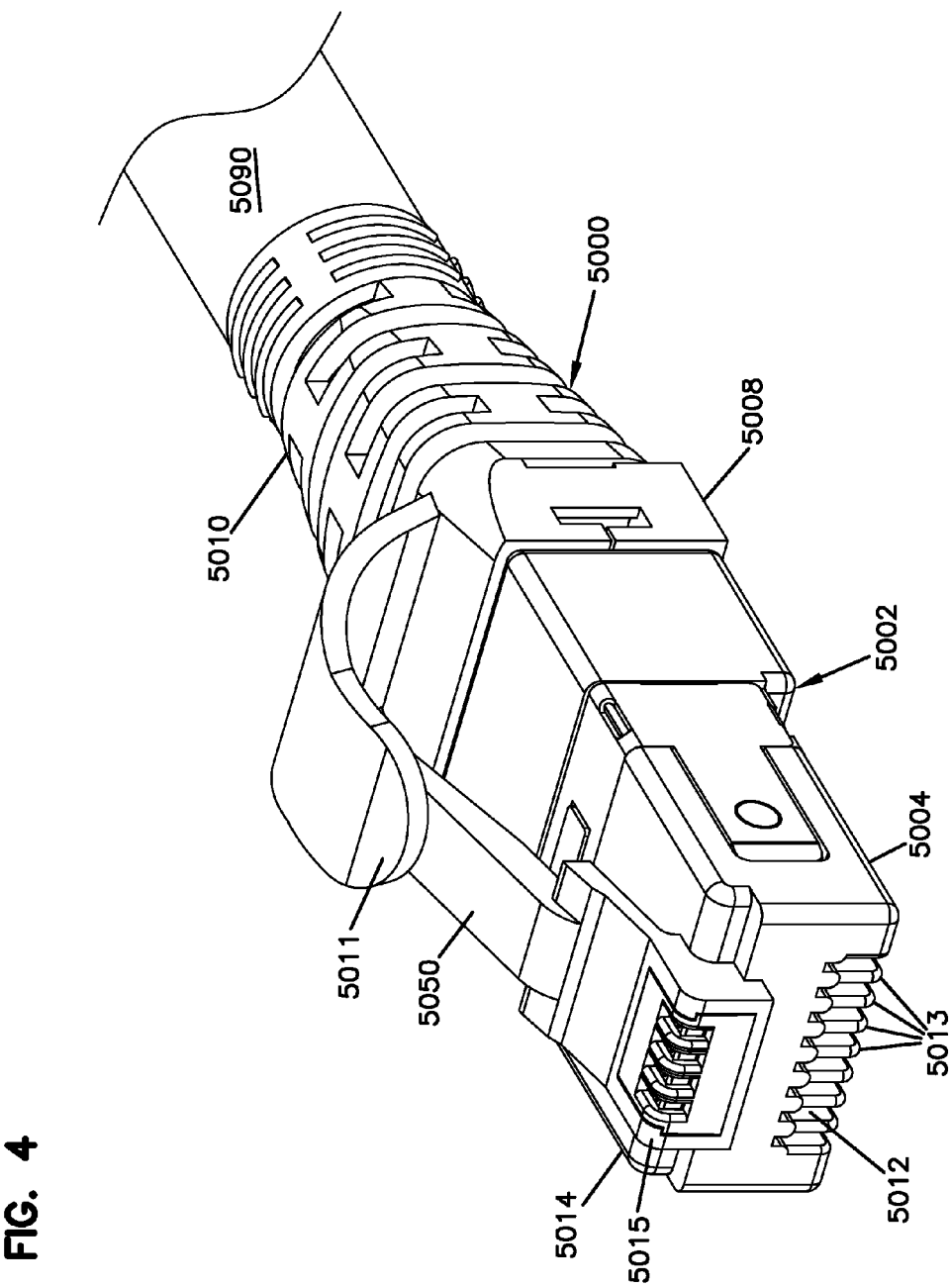
FIGS. 4-5 illustrate an example implementation of a connector system including a first example coupler assembly and fiber optic connectors having PLI functionality as well as PLM functionality.
Figure 5:
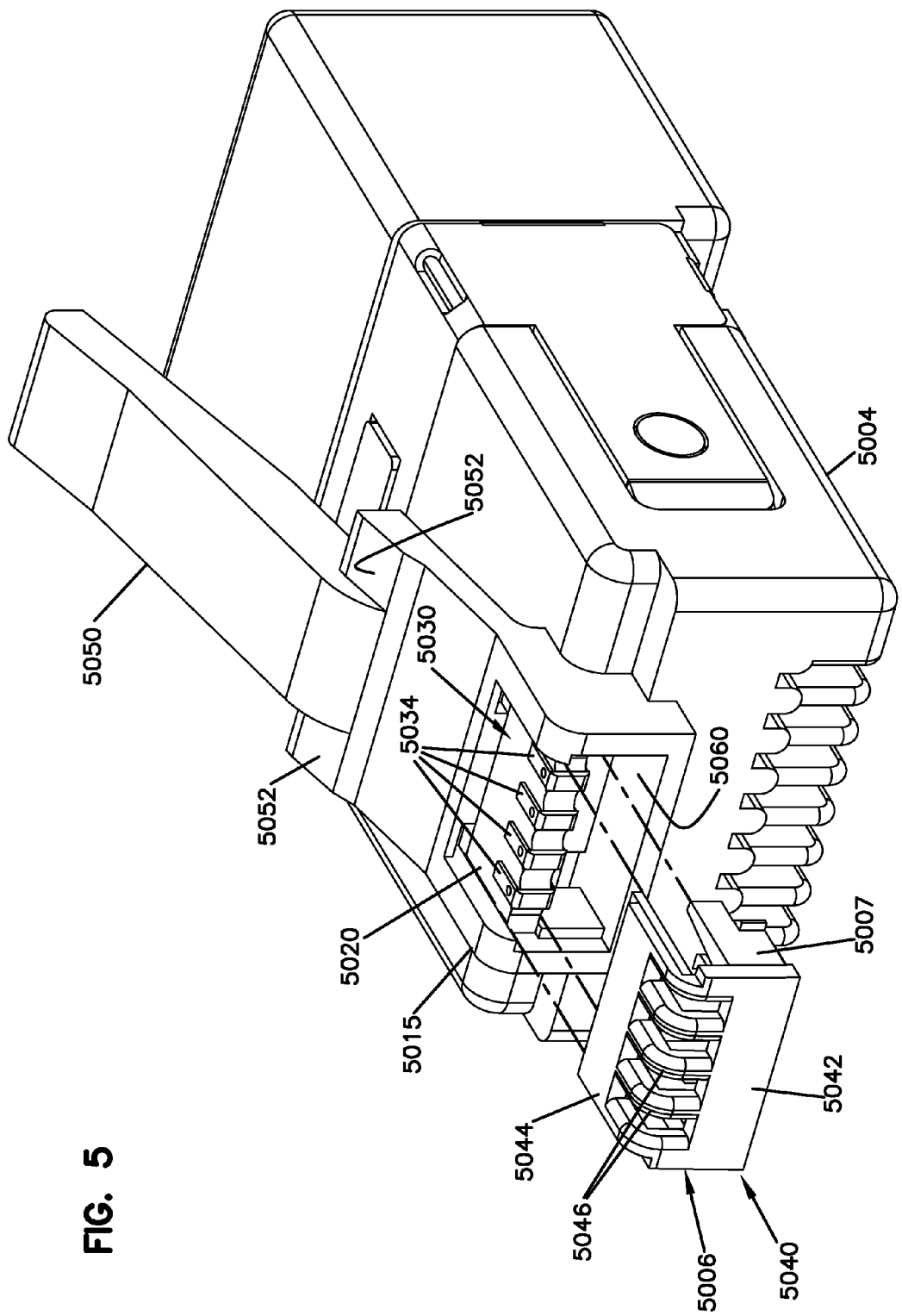
Figure 6:
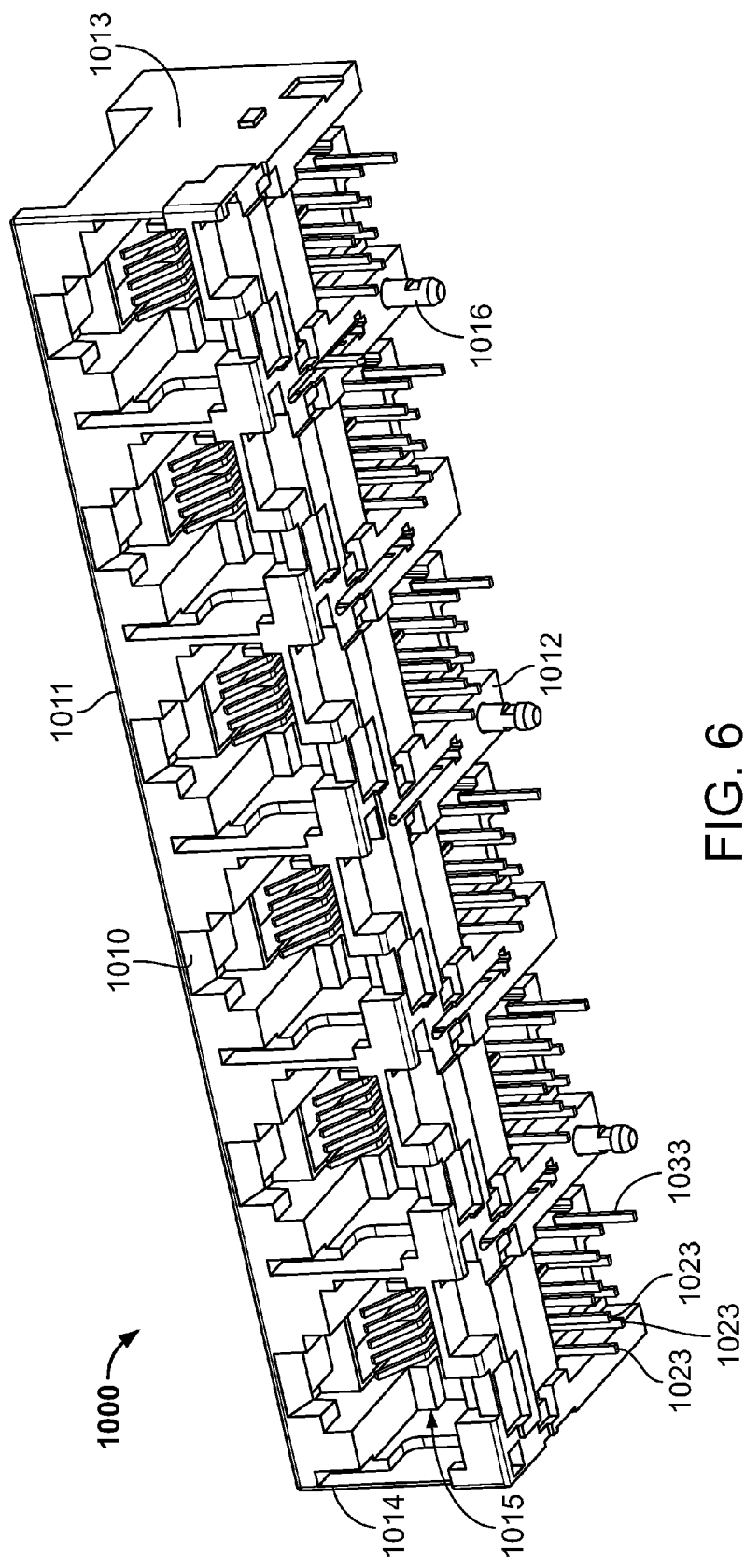
FIG. 6 is a bottom perspective view of one example implementation of a coupler assembly including a receptacle block having PLI functionality as well as PLM functionality in accordance with principles of the present disclosure.
Figure 9:
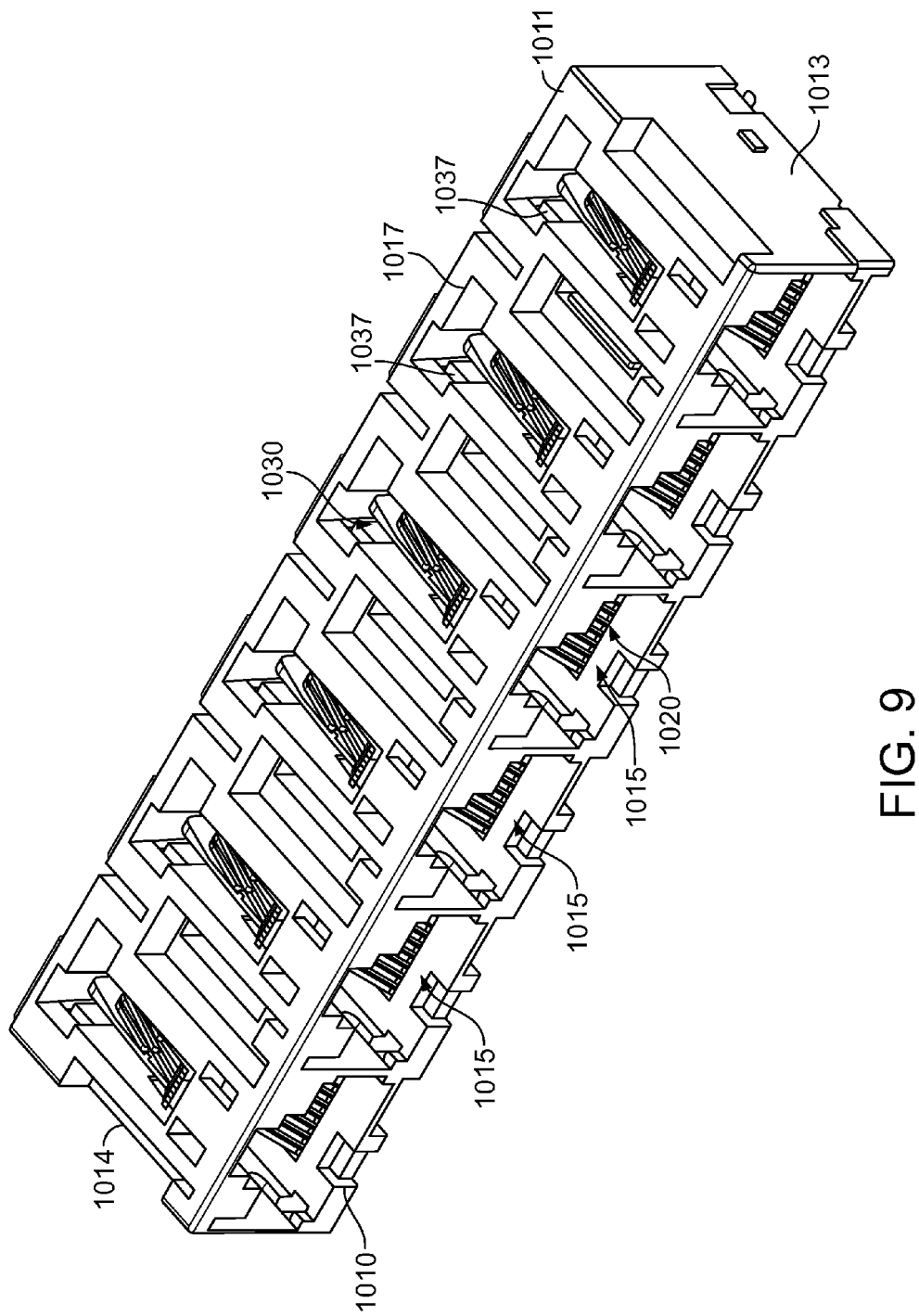
FIG. 9 is a top perspective view of the receptacle block of FIG. 6.

FIGS. 4-21 provide example implementations of physical layer management networks and components for electrical (e.g., copper) communications applications. FIGS. 4 and 5 show one example implementation of a connector arrangement 5000 in the form of a modular plug 5002 for terminating an electrical communications cable 5090. The connector arrangement 5000 is configured to be received within a port of a coupler assembly 1000 (FIGS. 6-16) as will be described with reference to FIGS. 17-19. In accordance with one aspect, the coupler arrangement 5000 includes a plug 5002, such as an RJ plug, that connects to the end of an electrical segment of communications media, such as twisted pair copper cable 5090, and the coupler assembly 1000 is a plug receptacle, such as an RJ jack.

The coupler assembly 1000 is configured to be mounted to a connector assembly, such as a communications blade (e.g., see FIG. 20) or a communications panel. One or more connector arrangements 5000 are configured to communicatively couple to a circuit board or to other segments of physical communications media at the coupler assembly 1000. Accordingly, communications data signals carried by a cable 5090 terminated by a first connector arrangement 5000 can be propagated to another media segment (e.g., twisted pair wires terminated at insulation-displacement contacts) or to a circuit board through the coupler assembly 1000.

The connector arrangement 5000 shown in FIGS. 4 and 5 includes a plug 5002 having a plug nose body 5004. The plug nose body 5004 can be attached to a wire manager 5008 and/or a boot 5010. The plug nose body 5004 includes a finger tab 5050 and a key member 5015 at a first side 5014 of the plug 5002. The plug nose body 5004 holds main signal contacts 5012 at a second side 5016 of the plug 5002. The main signal contacts 5012 are electrically connected to conductors (e.g., twisted pair conductors) of the communications cable 5090. Ribs 5013 protect the main signal contacts 5012.

Each connector arrangement 5000 is configured to store physical layer information (e.g., an identifier and/or attribute information) pertaining to the segment of physical communications media (e.g., the plug 5002 and/or the electrical cable 5090 terminated thereat). In certain implementations, a storage device 5030 may be installed on or in the plug body 5004. For example, in some implementations, the key member 5015 of the plug nose body 5004 defines a cavity 5060 (FIG. 5) in which the storage device 5030 can be stored. In some implementations, the plug 5002 includes a plug cover 5006 that mounts on the plug nose body 5004 to close the cavity 5060. Contact members 5034 of the storage device 5030 are accessible through slots 5046 in the key member 5015 or plug cover 5006.

In some embodiments, the storage device 5030 includes a printed circuit board 5020. In the example shown, the circuit board 5020 can be slid or otherwise positioned along guides defined in the cavity 5060. The circuit board 5020 includes a substrate with conductive traces electrically connecting contacts and lands. The circuit board 5020 also includes circuit components, such as an EEPROM, at the lands. In other embodiments, however, the storage device 5030 can include any suitable type of memory. The contact members 5034 permit connection of the EEPROM or other memory circuitry to a media reading interface of a coupler assembly as will be described herein.

Additional details pertaining to the plug 5002 can be found in U.S. application Ser. No. 12/907,724, filed Oct. 19, 2010, and titled "Managed Electrical Connectivity Systems," the disclosure of which is hereby incorporated herein by reference.

FIGS. 6-10 show one example implementation of a coupler assembly 1000 including a receptacle block 1010 having a top 1011, a bottom 1012, a first side 1013, and a second side 1014. In some implementations, the receptacle block 1010 includes pegs 1016 that extend downwardly from the bottom 1012 of the receptacle block to facilitate connection to a circuit board, panel, or other surface. In other implementations, the pegs 1016 may extend rearwardly from a rear of the receptacle block 1010, upwardly from the top 1011 of the receptacle block 1010, or from any other side. In still other implementations, the receptacle block 1010 may have other connection structures to mount the receptacle block 1010 to a structure.

The receptacle block 1010 defines one or more sockets 1015 in which one or more electrical plugs (e.g., plugs 5002) can be inserted. Certain types of receptacle blocks 1010 also define securement structures (e.g., notches, shoulders, latching detents, etc.) at the front of the socket 1015 to facilitate securing the plug 5002 within the socket 1015. In some implementations, the receptacle block 1010 defines a row of sockets 1015. In the example shown, the receptacle block 1010 defines six sockets 1015. In other implementations, the receptacle block 1010 may define greater or fewer sockets 1015. In still other implementations, the receptacle block 1010 may define two or more rows of sockets 1015, with the sockets 1015 of one row being vertically offset from the sockets 1015 of another row.

The receptacle block 1010 includes a first set of contacts 1020 within each socket 1015. For example, in one implementation, the receptacle block 1010 may include a plurality of RJ-45 contact pins. The first set of contacts 1020 are located so as to engage the main signal contacts 5012 on a plug received at the socket 1015 to establish an electrical connection therebetween. Accordingly, inserting the plug 5002 into the socket 1015 creates an electrical path between the terminated data cable 5090 and the first set of contacts 1020 over which communications signals, such as signals S1 of FIG. 1, are carried.

In some implementations, the first set of contacts 1020 includes one or more contact members 1021. In the example shown, the first set of contacts 1020 includes eight contact members 1021 positioned in a standard RJ-45 contact configuration. In other implementations, however, the first set of contacts 1020 may include two, three, four, five, six, twelve, or some other numbers of contact members 1021. In the example shown, the first set of contacts 1020 extend upwardly from a bottom of the socket 1015. In other implementations, the first set of contacts 1020 extend downwardly from a top of the socket 1015 or inwardly from a side of the socket 1015.

In the example shown, the contact members 1021 of the first set of contacts 1020 include ends 1023 that extend downwardly from a bottom 1012 of the receptacle 1010. In other implementations, the contact ends 1023 may extends outwardly from a rear of the receptacle block 1010. In still other implementations, the contact ends 1023 may extend from a top 1011 or side 1013, 1014 of the receptacle block 1010. In the example shown, the contact ends 1023 form pins configured to be connected to a circuit board. In other implementations, however, the contact ends 1023 may define other types of contact interfaces. For example, the contact ends 1023 may define insulation displacement contacts that receive electrical conductors (e.g., twisted pair wires).

In accordance with some aspects, the receptacle block 1010 also includes a second set of contacts 1030 that are electrically isolated from the first set of contacts 1020. The second set of contacts 1030 are located within each socket 1015 to engage the storage contacts 5034 on the plug 5002 to establish an electrical connection therebetween. If a plug that does not include a storage device 5030 is positioned in the socket 1015, the second set of contacts 1030 are configured to flex out of the way of the plug 5002 without interfering with or influencing the connection between the first contact set 1020 and the main signal contacts 5012 of the plug 5002.

In some implementations, the second set of contacts 1030 includes one or more contact members 1031. In one implementation, the second set of contacts 1030 includes three contact members 1031 (e.g., a power contact, a ground contact, and a data contact). In the example shown, the second set of contacts 1030 includes four contact members 1031. In other implementations, the second set of contacts 1030 may include two, five, six, ten, twelve, or some other numbers of contact members 1031. In the example shown, the second set of contacts 1030 extend downwardly from a top of the socket 1015 opposite the first set of contacts 1020. In other implementations, the second set of contacts 1030 may extend into the socket 1015 from a different direction. For example, second set of contacts 1030 may extend into the socket 1015 from the same direction as the first set of contacts 1020.

In the example shown, the contact members 1031 of the second set of contacts 1030 include ends 1033 that extend downwardly from the bottom 1012 of the receptacle block 1010. In other implementations, the contact ends 1033 may extends outwardly from the rear of the receptacle block 1010. In still other implementations, the contact ends 1033 may extend from the top 1011 or from one of the sides 1013, 1014 of the receptacle block 1010. In the example shown, the contact ends 1033 form pins configured to be connected to a circuit board. In other implementations, however, the contact ends 1033 may define other types of contact interfaces.

Figure 10:
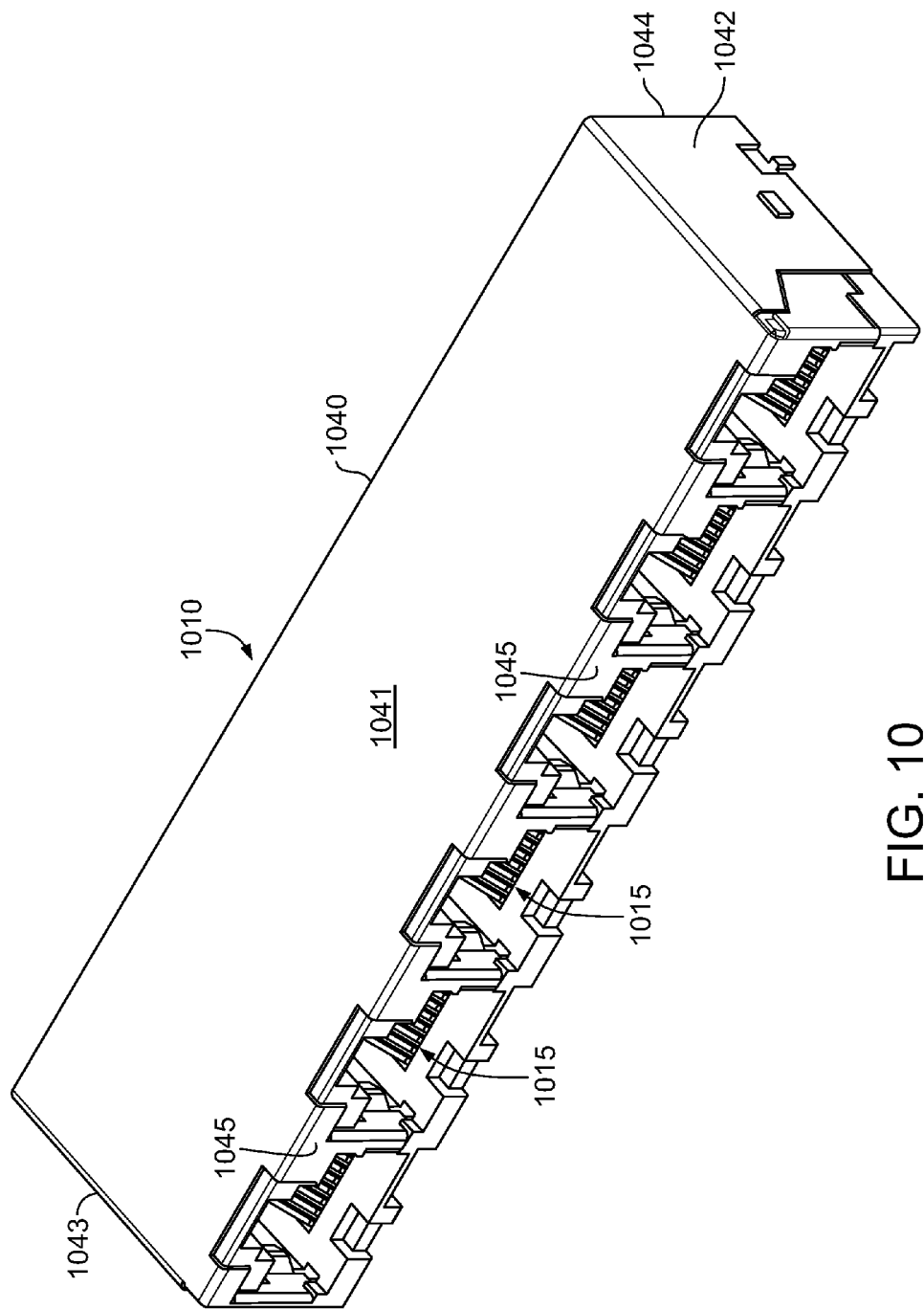
FIG. 10 is a top perspective view of the receptacle block of FIG. 6 in which a shield is coupled to the receptacle block.

Certain types of receptacle blocks 1010 may be unshielded (FIG. 9) and certain types of receptacle blocks 1010 may be shielded (FIG. 10). As shown in FIG. 10, a shielded receptacle block 1010 includes a conductive shield 1040 coupled to the receptacle block 1010. In one implementation, the conductive shield 1040 is formed of a metal material. In another implementation, the conductive shield 1040 is formed from a plastic or other non-conductive material coated in a conductive layer.

In the example shown, the shield 1040 forms a shell that surrounds the receptacle block 1010. For example, the shield 1040 includes a top plate 1041 that extends over the top 1011 of the receptacle block 1010, a first side plate 1042 that extends over the first side 1013 of the receptacle block 1010, a second side plate 1043 that extends over the second side 1014 of the receptacle block 1010, and a rear plate 1044 that extends over the rear of the receptacle block 1010. Tabs 1045 fold over the front of the receptacle block 1010 from the top plate 1041. In other implementations, the tabs 1045 may fold over the front of the receptacle from one or both sides 1013, 1014 of the receptacle block 1010.

FIGS. 11 and 12 show one example implementation of a second set of contacts 1030 suitable for use in the receptacle block 1010 described herein. The second set of contacts 1030 includes a plurality of contact members 1031 retained in channels 1035 defined in a module body 1034. First lengths of the second contact members 1031 extend from one end of the module body 1034 to define plug contact locations 1032. In certain implementations, the first lengths of the second contact members 1031 are resilient (i.e., flexible) to allow movement at the plug contact locations 1032 into and out of the socket 1015.

Second lengths of the second contact members 1031 extends from another end of the module body 1034 to define the terminal ends 1033. In some implementations, the terminal ends 1033 of the second contact members 1031 plug into a circuit board for connection to a processor (e.g., processor 217 of FIG. 2) or other such equipment. The processor can receive and manage signals obtained at the second contact members 1031.

In some implementations, the processor can communicate with the memory circuitry on the plug storage device 5030 via the second contact members 1031 and the printed circuit board. In some implementations, the processor is configured to obtain physical layer information from the connector storage device 5030. In some implementations, the processor is configured to write (e.g., new or revised) physical layer information to the connector storage device 5030. In some implementations, the processor is configured to delete physical layer information from the connector storage device 5030. In some implementations, the processor detects the presence or absence of a plug 5002 in each socket 1015, e.g., as will be described in more detail herein.

The module body 1034 is configured to facilitate insertion and retention of the second contact set 1030 at the receptacle block 1010. In some implementations, the module body 1034 includes one or more tabs or latching arms 1036 that interact with portions of the receptacle block 1010 to hold the second contact set 1030 within the socket 1015 of the receptacle block 1010. In the example shown, the module body 1034 includes two resilient tabs 1036 extending upwardly from the module body 1034 at opposite sides of the module body 1034. A distal end of each resilient tab 1036 cams outwardly to define a top surface or shoulder 1037.

Figure 13:
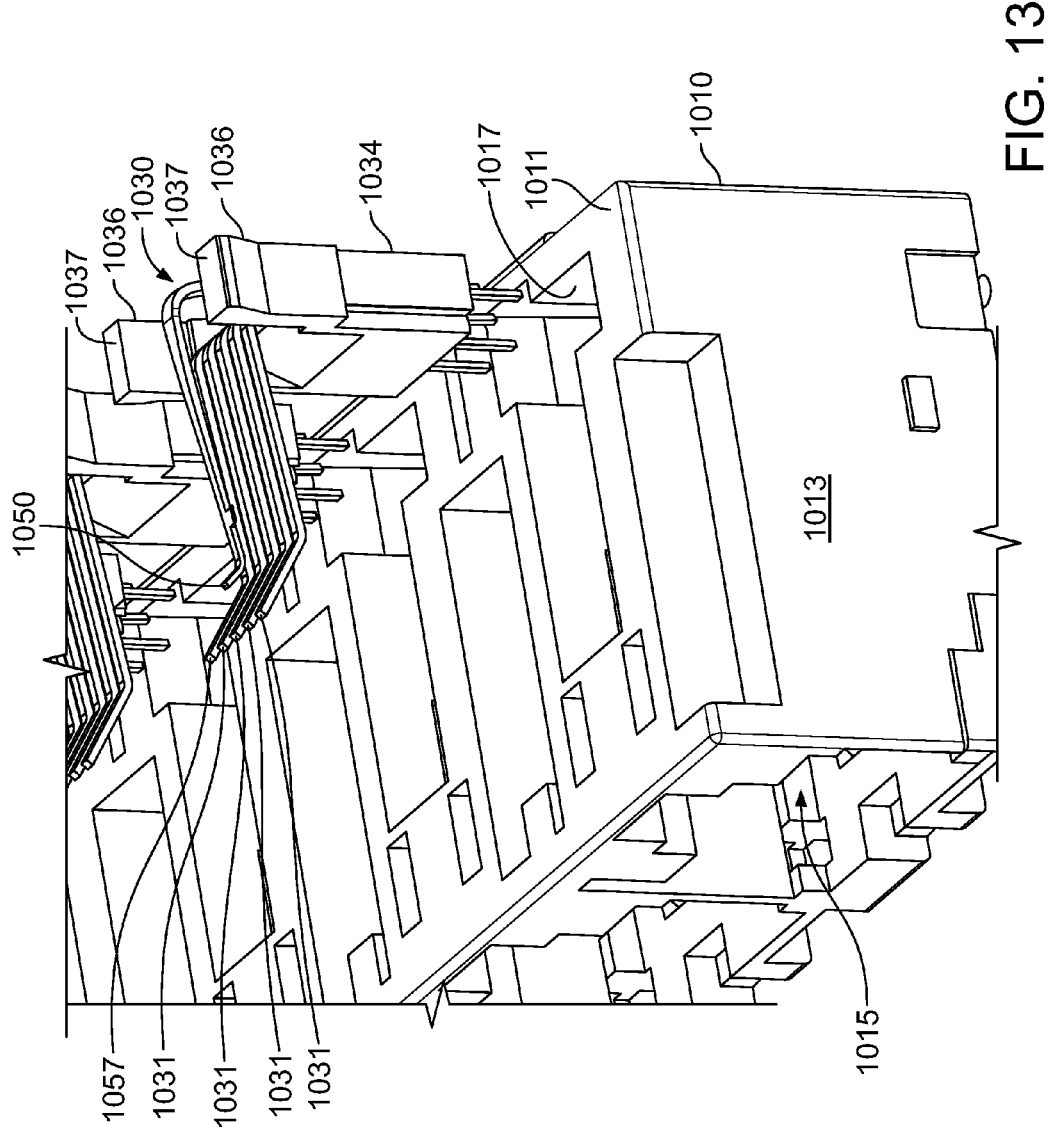
FIG. 13 is a perspective view showing the second contact set of FIG. 11 exploded out from the receptacle block of FIG. 6.
Figure 14:
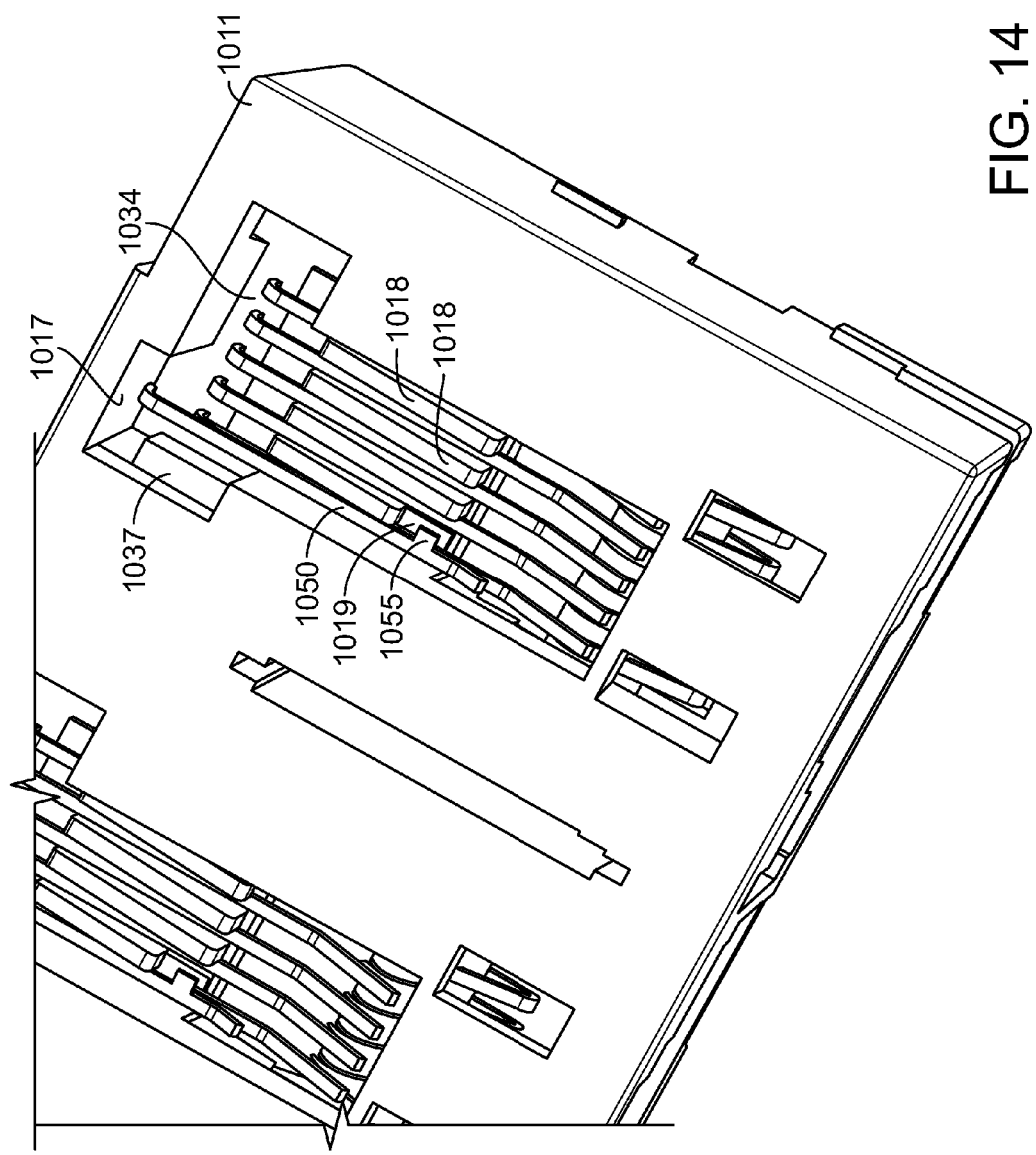
FIG. 14 is a top view of a portion of the receptacle block of FIG. 6 with the second contact set visible through an opening leading to a socket defined in the receptacle block.

As shown in FIGS. 13 and 14, in some implementations, a module body 1034 is inserted into the receptacle block 1010 through an opening 1017 defined in the top 1011 of the receptacle block 1010. The opening 1017 leads to a respective one of the sockets 1015. As the module body 1034 is inserted, the resilient tabs 1036 flex inwardly as the tabs 1036 cam over the edges of the top surface 1011 that define the respective opening 1017. When the module housing 1034 has been sufficiently inserted, the tabs 1036 flex back so that the top shoulders 1037 move beneath and face the top surface 1011 of the receptacle block 1010 (see FIG. 14). Accordingly, the tabs 1036 inhibit accidental removal of the module housing 1034 from the receptacle block 1010.

In the example shown, the top 1011 of the receptacle block 1010 defines six openings, one for each socket 1015. In other implementations, one opening 1017 may be sufficiently wide to lead to multiple sockets 1015. In certain implementations, the opening 1017 extends a sufficient distance between the front and rear of the receptacle block to allow the contact members 1031 to pass generally horizontally through the top 1011 of the receptacle block 1010 when the module housing 1034 is inserted through a rear of the opening 1017.

A support platform extends across a central portion of the opening 1017 at the top 1011 of the receptacle block 1010. Ribs 1018 extends upwardly from the support platform (see FIG. 14). The ribs 1018 are spaced so that each rib 1018 extends upwardly between a pair of adjacent contact members 1031 of the second contact set 1030. The ribs 1018 inhibit adjacent contact members 1031 from touching each other during use. A recessed shoulder 1019 is defined in one of the ribs 1018 (see FIG. 14).

In accordance with some aspects, the second contact set 1030 also includes a sensing contact 1050 that is configured to interact with one or more of the contact members 1031 to provide presence sensing functionality to the receptacle block

1010. In some implementations, the sensing contact 1050 and at least one of the second contact members 1031 form a switch that selectively completes a circuit. The switch completes the circuit when a portion of the contact members 1031 touches along a contact surface 1054 defined on the sensing contact 1050. In one implementation, the portion wipes along the contact surface 1054 of the sensing contact 1050.

The sensing contact 1050 includes a first section 1051 extending from a base 1052. In certain implementations, the first section 1051 is resilient (i.e., flexible). Accordingly, pushing the contact member portion against the first section 1051 of the sensing contact 1050 causes the contact member portion to wipe the contact surface 1054 defined along part of the length of the first section 1051. In other implementations, the first section 1051 is rigid. In some implementations, the first section 1051 extends generally parallel to the second contact members 1031. In other implementations, the first section 1051 extends transverse to the second contact members 1031.

A second section of the sensing contact 1050 extends from the base to a termination end 1053. In some implementations, the termination end 1053 is configured to plug into a circuit board with the termination ends 1033 of the second contact members 1031. In certain implementations, the termination end 1053 is electrically connected to at least one of the contact members 1031 to form the circuit. For example, a voltage may be applied to the terminal end 1033, 1053 of one of the contact member 1031 and the sensing contact 1050. A change in voltage, which occurs when the circuit is completed, can be detected by circuitry on or connected to the circuit board.

At least the base 1052 of the sensing contact 1050 is retained by the module housing 1034. In certain implementations, the first section 1051 extends upwardly and forwardly from the module housing 1034 and the termination end 1053 extends downwardly from the module housing 1034 adjacent the termination ends 1033 of the second contact members 1031. In the example shown, the first section 1051 of the sensing contact 1050 extends farther upwardly from the module housing 1034 than the first lengths of the second contact members 1031 so that the first section 1051 extends over a portion of the second contact members 1031.

In some implementations, the module housing 1034 includes an extended portion 1038 at which the sensing contact 1050 is positioned. In the example shown, the extended portion 1038 of the module housing 1034 protrudes rearwardly from the module housing 1034 and the sensing contact 1050 is located in a shallow channel defined in the extended portion 1038. In certain implementations, the sensing contact 1050 includes a leg 1056 that extends into a channel 1039 defined in the extended portion 1038 of the module housing 1034 to aid in holding the sensing contact 1050 to the module housing 1034. In another implementation, the sensing contact 1050 can be partially encased in the module housing 1034 (e.g., via injection molding). In other implementations, the sensing contact 1050 may be adhered, friction-fit, snap-fit, or latched to the module housing.

In the example shown, the sensing contact 1050 includes a nub 1055 on the first section 1051. The nub 1055 is located to align with the recessed shoulder 1019 of the support platform of the receptacle block 1010. Accordingly, the nub 1055 may seat on the recessed shoulder 1019 when the second contact set 1030 is received in the socket 1015 of the receptacle block 1010. The recessed shoulder 1019 inhibits the sensing contact 1050 from flexing towards the second contact members 1031.

In some implementations, the sensing contact 1050 is sized and configured to interact with an extension of one of the second contact members 1031 instead of directly with one of the second contact members 1031. For example, in certain implementations, one of the second contact members 1031 includes an arm 1057 that extends parallel to the second contact member 1031 for at least part of the length of the second contact member 1031. The arm 1057 also defines a plug contacting section 1032 adjacent to the plug contacting section 1032 of the contact member 1031. In the example shown in FIG. 12, a resilient arm 1057 branches from one of the second contact members 1031 at a connecting section 1058. In some implementations, the connecting section 1058 is located within the module housing 1034 when the second contact set 1030 is assembled.

In accordance with some implementations, the sensing contact 1050 and the arm 1057 form the switch that selectively completes the presence detection circuit. As noted above, the terminal ends 1033, 1053 of the second contact members 1031 and the sensing contact 1050 are connected via a circuit board. The switch completes the circuit when a contact surface 1059 of the arm 1057 touches the contact surface 1054 on the sensing contact 1050. In certain implementations, the contact surface 1059 on the arm 1057 wipes along the contact surface 1054 of the sensing contact 1050. For example, the contact surface 1059 of the arm 1057 aligns with the contact surface 1054 of the sensing contact 1050 when the second contact set 1030 is in an initial configuration (see FIG. 15). The arm 1057 may then be pushed upwardly towards the sensing contact 1050 until the contact surface 1059 of the arm 1057 engages the contact surface 1054 of the sensing contact 1050 (see FIG. 16).

Figure 17:
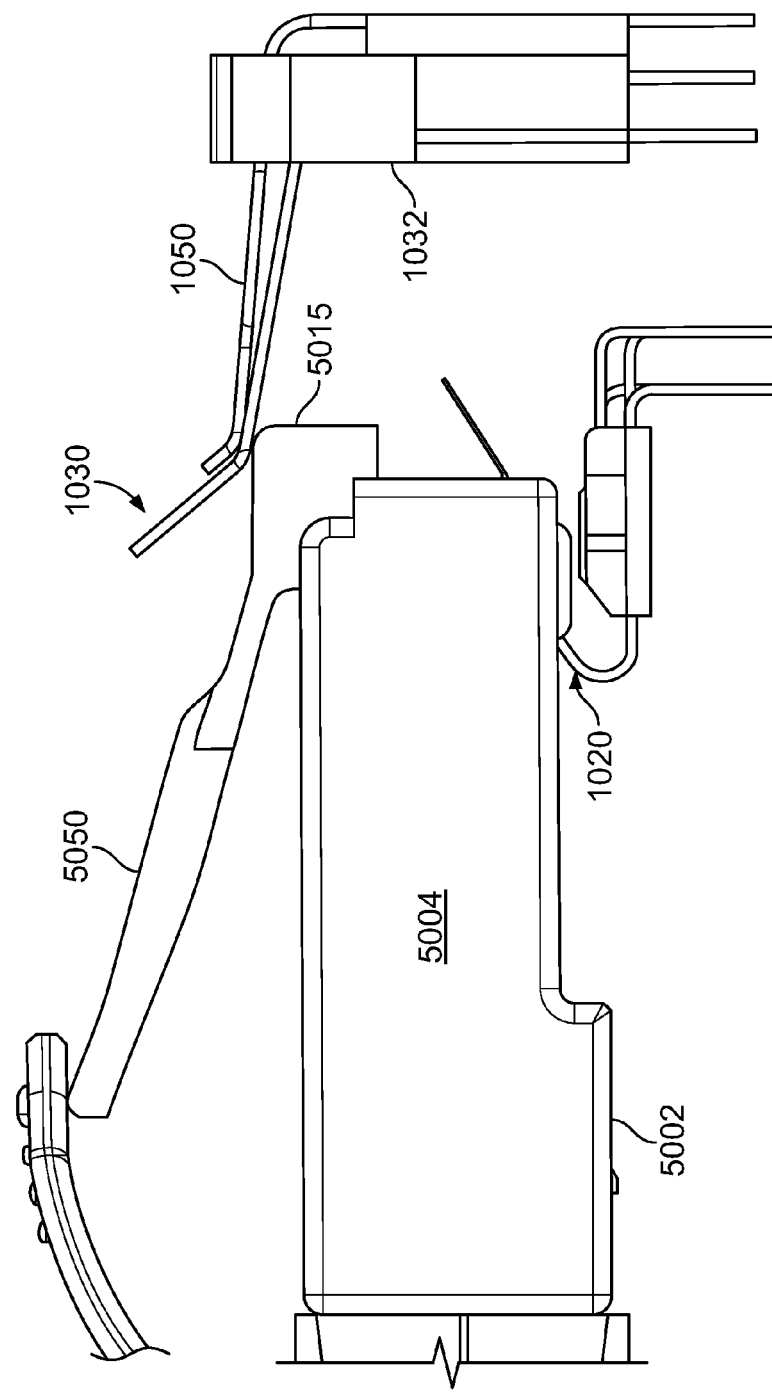
FIGS. 17-19 show the effect of inserting a plug into a socket of the receptacle block of FIG. 6.
Figure 19:
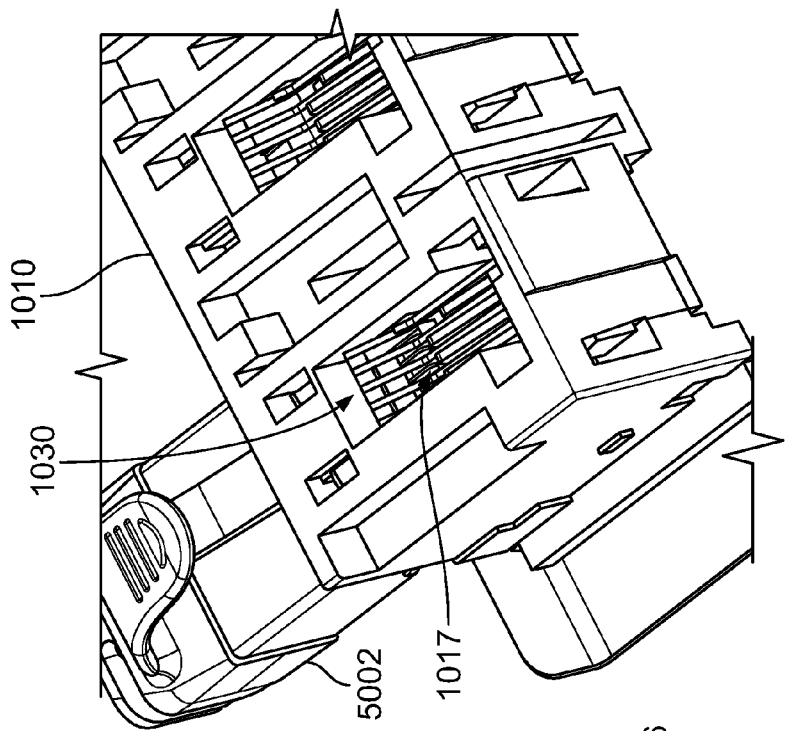
Figure 18:
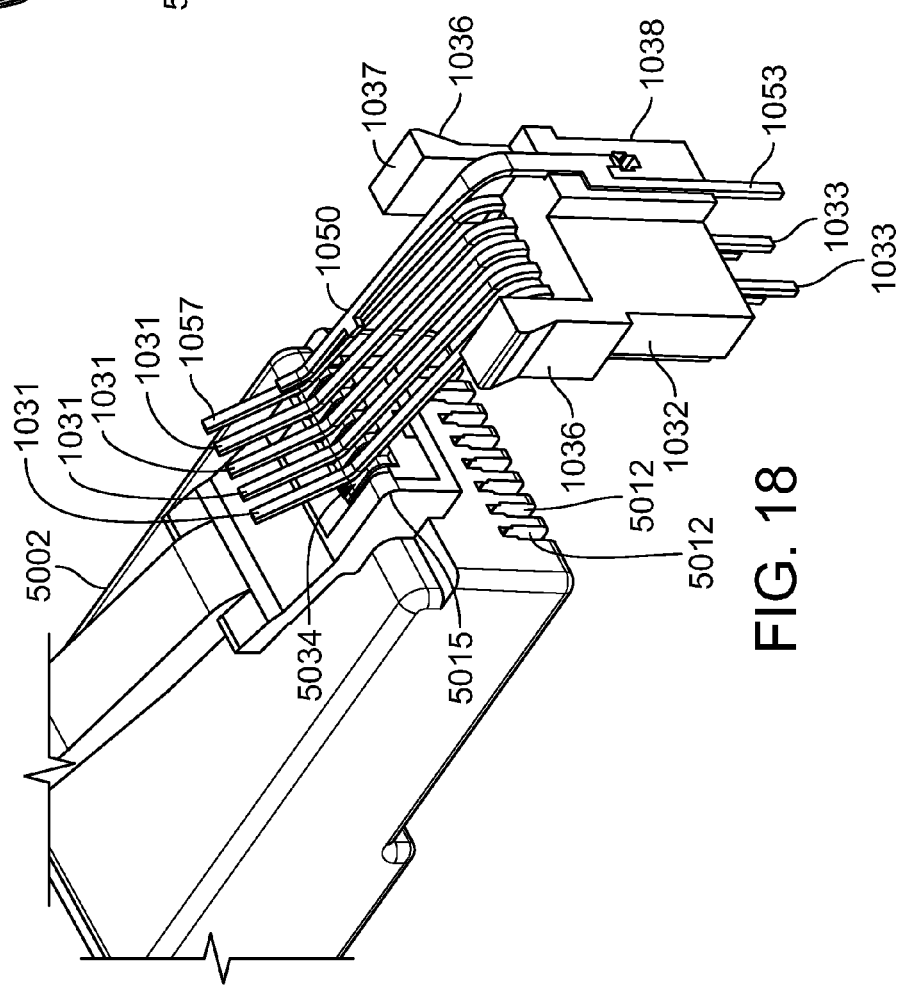

FIGS. 17-19 show the effect of inserting a plug, such as plug 5002, into one of the sockets 1015 of the receptacle block 1010. As shown in FIG. 17, the main signal contact 5012 on the plug 5002 engage the first contact set 1020 located in the socket 1015. The contact pads 5034 of the storage device 5030 engages the second contact set 1030. For example, as shown in FIG. 18, each contact member 1031 of the second contact set 1030 extends into the slots 5046 defined in the cover 5006 or housing 5004 of the plug 5002 to touch or wipe across the pads 1034 of the storage device.

In some implementations, the arm 1057 of the second contact set 1030 is positioned to ride along the key member 5015 of the plug 5002 as the plug 5002 is inserted in the socket 1015. The key member 5015 of the plug 5002 pushes the arm 1057 upwardly towards the sensing contact 1050 to cause the contact surface 1059 of the arm 1057 to engage the contact surface 1054 of the sensing contact 1050. In accordance with certain aspects, inserting a plug 5002 into the socket 1015 will complete the switch even if the plug 5002 does not include a storage device 5030. If no storage device 5030 is present on the plug 5002, then the all of the second contact members 1031, including the arm 1057, will ride along the key member 5015 of the plug 5002

As noted above, nub 1055 on the sensing contact 1050 rests on a shoulder 1019 of the receptacle block 1010. The nub 1055 thereby inhibits the first section 1051 of the sensing contact 1050 from moving towards the arm 1057. Accordingly, the nub 1055 inhibits the switch from being completed when a plug 5002 is not inserted at the socket 1015.

Figure 20:
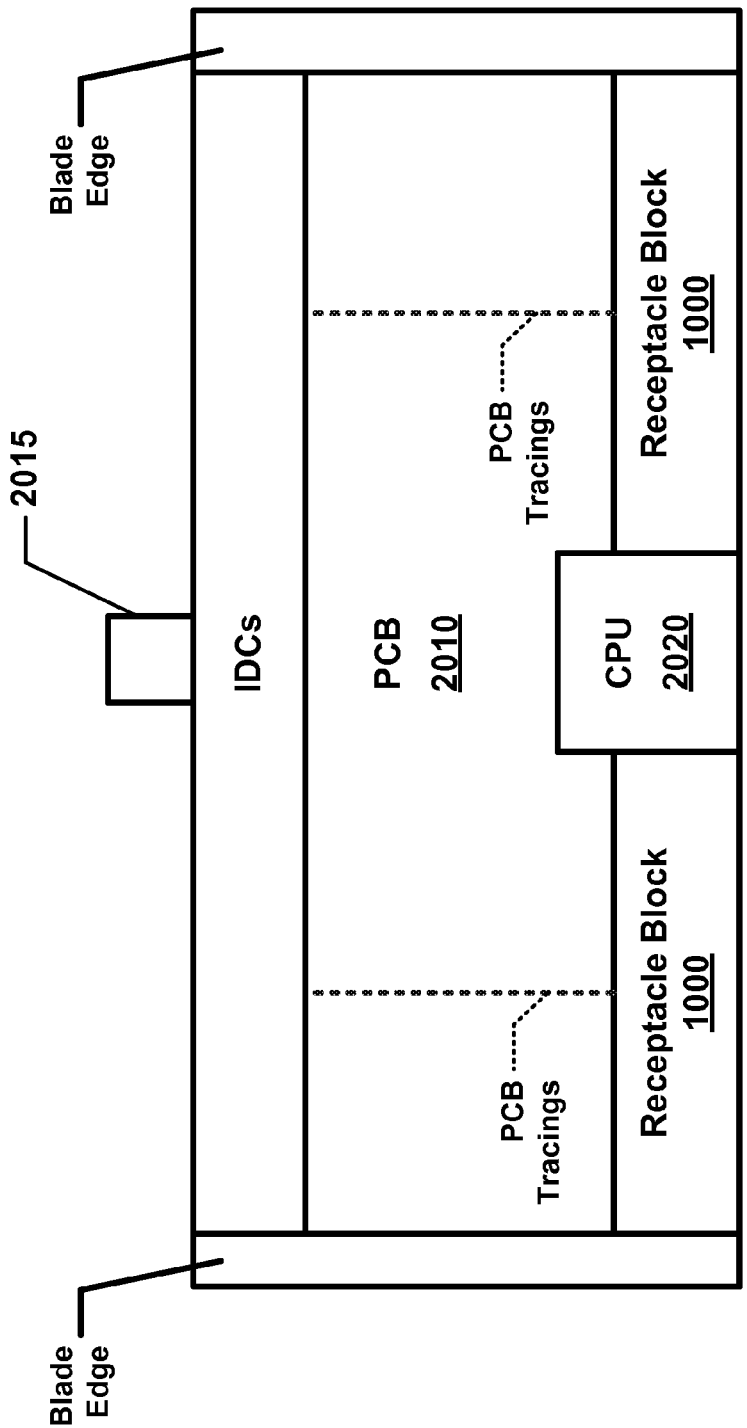
FIG. 20 is a block diagram showing an example connector assembly implemented as a blade configured to mount to a chassis, the blade including one or more coupler assemblies for receiving fiber optic connectors.

FIG. 20 is a schematic diagram showing one example implementation of a connector assembly 2000 on which the coupler assembly 1000 described herein can be implemented. The example connector assembly 2000 is implemented as a bladed chassis. The chassis 2000 includes a blade 2001 on which one or more coupler assemblies 1000, such as receptacle block 1010 described herein, may be mounted. In the example shown, a first receptacle block 1010 is located at the front of the blade 2001 at a first side and a second receptacle block 1010 is located at the front of the blade 2001 at a second side. In other implementations, greater or fewer receptacle blocks 1010 may be positioned on the blade 2001. In still other implementations, the receptacle blocks 1010 may be positioned at other locations on the blade (e.g., offset rearwardly from the front of the blade 2001).

A processor 2220 also may be positioned on the blade 2001. In the example shown, the processor 2220 may be positioned between the first and second receptacle blocks 1010. In other implementations, the processor 2220 may be positioned elsewhere on the blade 2001 (e.g., at a rear of the blade 2001). A circuit board 2010 also may be positioned on the blade 2001 to electrically connect the coupler assembly 1000 to the processor 2220. In some implementations, the circuit board 2010 extends beneath the receptacle blocks 1010 and the processor 2220. In certain implementations, the circuit board 2010 includes a rearward extension. In other implementations, the circuit board 2010 extends over a majority of the blade 2001.

In certain implementations, a portion of the circuit board 2010 may define a connection end 2015 that is configured to connect (e.g., via card-edge connection) to a network port of a data network (e.g., see network 218 of FIG. 2). In the example shown, the connection end 2015 is provided at a rear of the blade 2001. In other implementations, however, the connection end 2015 may be provided elsewhere (e.g., at a side or front of the blade 2001).

Figure 21:
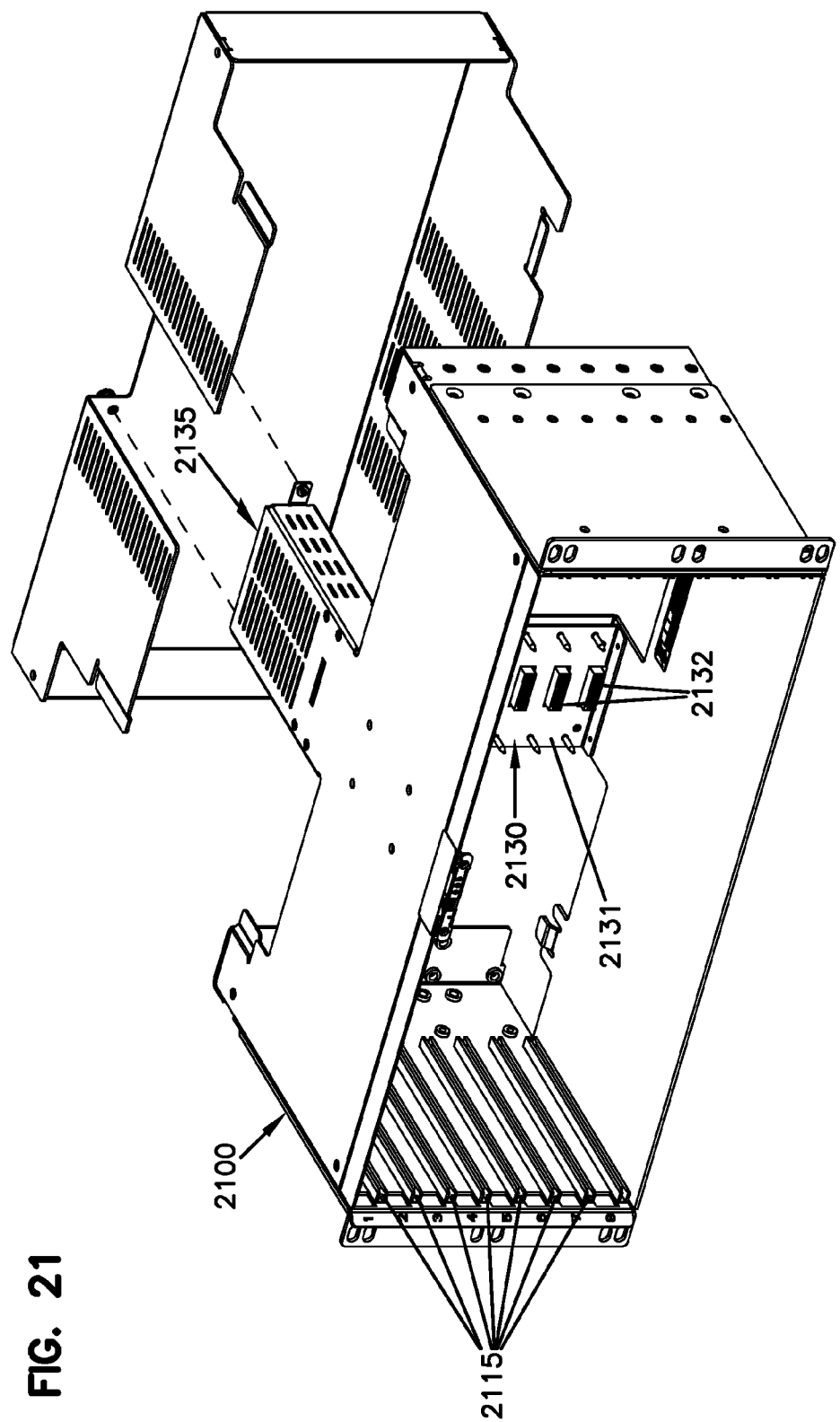
FIG. 21 is a perspective view of an example chassis configured to receive one or more blades, such as the blade shown in FIG. 20.

FIG. 21 is a perspective view of an example chassis 2100 at which one or more of the blades 2001 may be received. The chassis 2100 includes a plurality of guides 2115 at which the blades 2001 are mounted to move relative to the chassis 2100. In some implementations, the blades 2001 slide along the guides 2115 relative to the chassis 2100 between open and closed positions. The receptacle blocks 1010 on the blades 2001 are positioned at the front of the chassis 2100 when the respective blade 2001 is in the closed position. At least a portion of the blade 2001 extends outwardly from the chassis 2100 when the blade 2001 is in the open position.

In accordance with some aspects, a backplane 2130 is provided at the rear of certain types of chassis 2100. The backplane 2130 includes a circuit board 2131 at which one or more blade ports 2132 are located. The connection end 2015 of each blade 2001 is configured to plug into one of the blade ports 2132 of the backplane 2130 when the blades 2001 are received in the chassis 2100. A network port also is provided on the chassis. For example, the network port may be formed on a chassis processor module 2135 may be connected to the backplane 2130. The chassis processor module 2135 may manage communication between the blade processors 2020 and the rest of a data network (e.g., IP network 218 of FIG. 2).

In some implementations, the blade processors 2020 remain connected to the backplane 2130 while the blade 2001 is moved between the open and closed positions. For example, a flexible cable may connect each blade 2001 to one of the blade ports 2132 on the backplane 2130.

Additional details regarding bladed chassis systems can be found in U.S. application Ser. No. 13/025,750, filed Feb. 11, 2011, and titled "Communications Bladed Panel System," the disclosure of which is hereby incorporated herein by reference in its entirety.

The above specification, examples and data provide a complete description of the manufacture and use of the composition of the invention. Since many implementations can be made without departing from the spirit and scope of the invention, the invention resides in the claims hereinafter appended.

The invention claimed is:

1. A communications receptacle block comprising:
a block housing having a front, a rear, a top, a bottom, a first side, and a second side, the block housing defining at least one socket configured to receive a plug from the front of the block housing, the top of the block housing defining at least one opening leading to the socket;
a plurality of first contact members extending into the socket from the bottom of the block housing, each of the first contact members being electrically conductive;
a plurality of second contact members extending into the socket from the top of the block housing, one of the second contact members including a flexible arm extending generally parallel with the second contact member, each of the second contact members being electrically conductive; and
a sensing contact extending parallel to the second contact members, the sensing contact being electrically conductive, the sensing contact being laterally aligned with and vertically offset from the flexible arm, and the sensing contact including a flexible section that is configured to be contacted by the flexible arm when the flexible arm is moved upwardly.

2. The receptacle block of claim 1, further comprising a printed circuit board positioned at the block housing, the printed circuit board electrically connecting the sensing contact with at least the one second contact member.

3. The receptacle block of claim 1, wherein the plurality of first contact members includes RJ-45 pin members.

4. The receptacle block of claim 1, wherein the arm is positioned to align with a key member of the plug.

5. The receptacle block of claim 1, wherein the block housing defines a plurality of sockets, each socket receiving a respective plurality of first contact members, a respective plurality of second contact members, and a respective sensing contact.

6. The receptacle block of claim 5, wherein the block housing defines six sockets.

7. The receptacle block of claim 1, wherein the plurality of second contact members includes at least three contact members.

8. The receptacle block of claim 7, wherein the plurality of second contact members includes four contact members.

9. The receptacle block of claim 1, wherein a support platform extends across the opening at the top of the block housing, the support platform defining ribs.

10. The receptacle block of claim 9, wherein one of the ribs defines a recessed shoulder.

11. The receptacle block of claim 10, wherein the sensing contact includes a laterally extending nub that seats on the recessed shoulder at the support platform.

12. A media reading interface comprising:
a module housing defining a plurality of channels, the module housing also including resilient tabs extending upwardly from opposite sides of the module housing;
a plurality of contact members retained in the channels defined in the module housing, each of the contact members having a first length that extends upwardly and forwardly of the module housing and each of the contact members having a second length that extends downwardly of the module housing to define a plurality of terminal ends;
a resilient arm attached to a first of the contact members, the arm having a first spring section that extends generally parallel with the first length of the first contact member; and a sensing contact retained at the module housing, the sensing contact having a first length extending upwardly and forwardly of the module housing and a second length extending downwardly of the module housing to define an additional terminal end, the first length of the sensing contact being laterally aligned with and vertically offset from the resilient arm.

13. The media reading interface of claim 12, wherein the module housing also includes an extended portion that protrudes rearwardly from the module housing, and wherein the sensing contact is retained at the extended portion of the module housing.

14. The media reading interface of claim 13, wherein the sensing contact includes a leg that extends into a channel defined in the extended portion of the module housing to aid in retaining the sensing contact at the module housing.

15. The media reading interface of claim 12, wherein the first lengths of the contact members extend in a row between the opposite sides of the module housing.

16. The media reading interface of claim 15, wherein the first spring section of the resilient arm is aligned in the row with the first lengths of the contact members.

17. The media reading interface of claim 12, wherein the resilient tabs cam outwardly at distal ends of the tabs.

18. The media reading interface of claim 17, wherein tops of the resilient tabs define flat shoulders.

19. A connector assembly comprising:
a receptacle block having a top, a bottom, a front, a rear, a first side and a second side, the receptacle block defining a plurality of sockets, each socket being configured to receive a plug connector from the front of the receptacle block, the receptacle block also including pegs extending downwardly;
a plurality of first contact sets, each first contact set extending upwardly through the bottom of the receptacle block and into a respective one of the sockets;
a plurality of media reading interfaces, each media reading interface extending upwardly through the bottom of the receptacle block and into a respective one of the sockets, each of the media reading interfaces including a plurality of contact members aligned in a row and a sensing contact located at a position offset from the row;
a circuit board positioned at the bottom of the receptacle block, the pegs of the receptacle block securing the receptacle block to the circuit board, the circuit board also connecting the sensing contact of each media reading interface to at least one of the contact members of the respective media reading interface.

20. The connector assembly of claim 19, wherein each of the first contact sets includes eight RJ-45 pins.

21. The connector assembly of claim 19, wherein the receptacle block defines six sockets.

22. The connector assembly of claim 19, wherein each of the media reading interfaces includes at least three contact members.

23. The connector assembly of claim 22, wherein each of the media reading interfaces includes four contact members.

24. A method of assembling a receptacle block comprising:
providing a block housing defining a plurality of sockets at a front and defining a plurality of openings, each opening leading to one of the sockets;
positioning a plurality of first contact members at each socket so that at least a portion of the first contact members extend into the socket;
providing a plurality of media reading interfaces, each media reading interface including a module housing, a plurality of second contact members retained at the module housing, and a sensing contact retained at the module housing, the module housing including latching tabs; and
inserting each of the media reading interfaces into one of the sockets through the respective opening until the latching tabs of the respective module housing snap-over a surface defining the respective opening.

* * * * *